(12) United States Patent
Liu et al.

(10) Patent No.: US 10,777,220 B2
(45) Date of Patent: Sep. 15, 2020

(54) COIL ROUTING DESIGNS FOR DUAL AND TRIPLE PERPENDICULAR MAGNETIC RECORDING (PMR) WRITERS

(71) Applicant: Headway Technologies, Inc., Milpitas, CA (US)

(72) Inventors: Yue Liu, Fremont, CA (US); Ying Liu, San Jose, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/966,192

(22) Filed: Apr. 30, 2018

(65) Prior Publication Data

US 2019/0333531 A1    Oct. 31, 2019

(51) Int. Cl.
| | |
|---|---|
| *G11B 5/17* | (2006.01) |
| *G11B 5/29* | (2006.01) |
| *G11B 5/48* | (2006.01) |
| *G11B 5/127* | (2006.01) |

(52) U.S. Cl.
CPC .............. *G11B 5/17* (2013.01); *G11B 5/1278* (2013.01); *G11B 5/29* (2013.01); *G11B 5/4813* (2013.01)

(58) Field of Classification Search
None
See application file for complete search history.

(56) References Cited

U.S. PATENT DOCUMENTS

| | | | | |
|---|---|---|---|---|
| 5,134,534 A | * | 7/1992 | Sasaki | G11B 5/29 360/123.36 |
| 5,461,528 A | * | 10/1995 | Keel et al. | G11B 5/4886 360/123.01 |
| 6,665,136 B2 | | 12/2003 | Clinton et al. | |
| 7,075,756 B1 | * | 7/2006 | Mallary et al. | G11B 5/1278 360/317 |
| 7,633,711 B2 | | 12/2009 | Hsiao et al. | |
| 7,907,360 B2 | | 3/2011 | Mak et al. | |
| 7,936,646 B2 | | 5/2011 | McCormack et al. | |

(Continued)

OTHER PUBLICATIONS

Co-pending U.S. Appl. No. 15/942,640, filed Apr. 2, 2018, by Kowand Liu et al., "Magnetic Core and Coil Design for Double Perpendicular Magnetic Recording (PMR) Writers," 50 pgs.

(Continued)

*Primary Examiner* — Craig A. Renner
(74) *Attorney, Agent, or Firm* — Saile Ackerman LLC; Stephen B. Ackerman

(57) ABSTRACT

Dual and triple PMR writers are disclosed wherein the number of writer pads required to energize the selected PMR writer is minimized to three or four, respectively, with a coil configuration wherein separate top coils are connected by separate interconnects or side taps to separate bottom coils. Either top coils or bottom coils may be linked to a common W− pad. Alternatively, there may be one bottom coil that allows all output current to flow to a common W− pad. Coils may have a pancake or helical shape. In dual PMR writer embodiments, there may be one or two dynamic fly height heater coils. Magnetic performance in the selected writer of a dual PMR writer is similar to that of a single PMR writer with regard to erase width in AC mode (EWAC), Hy field, trailing and side shield return fields, down-track and cross-track gradient.

5 Claims, 22 Drawing Sheets

(56) References Cited

U.S. PATENT DOCUMENTS

| | | | |
|---|---|---|---|
| 8,009,403 | B1 | 8/2011 | Mallary et al. |
| 8,218,264 | B1 | 7/2012 | Sasaki et al. |
| 8,274,758 | B2 | 9/2012 | Wu et al. |
| 8,810,764 | B2 | 8/2014 | Nishida et al. |
| 8,828,248 | B2 | 9/2014 | Mao et al. |
| 8,836,059 | B2 | 9/2014 | Ahn et al. |
| 9,171,561 | B1 | 10/2015 | Gadbois et al. |
| 9,387,568 | B1 | 7/2016 | Ilaw et al. |
| 9,613,642 | B1 | 4/2017 | Erden et al. |
| 9,754,612 | B2 | 9/2017 | Wei et al. |
| 9,805,744 | B1 | 10/2017 | Xue et al. |
| 2006/0145721 | A1 | 7/2006 | Ton-Churo |
| 2008/0043355 | A1* | 2/2008 | Ota ................ G11B 5/455 360/31 |
| 2009/0251821 | A1* | 10/2009 | Song et al. ........ G11B 5/1278 360/110 |
| 2010/0007986 | A1 | 1/2010 | Mak et al. |
| 2016/0254014 | A1 | 9/2016 | Biskeborn et al. |
| 2017/0256275 | A1 | 9/2017 | Hutchinson et al. |

OTHER PUBLICATIONS

Co-pending U.S. Appl. No. 15/912,821, filed Mar. 6, 2018, by Yuhui Tang et al., "Designs for Multiple Perpendicular Magnetic Recording (PMR) Writers and Related Head Gimbal Assembly (HGA) Process," 49 pgs.

Co-pending U.S. Appl. No. 15/913,167, filed Mar. 6, 2018, by Yue Liu, "Dual Perpendicular Magnetic Recording (PMR) Writer Base Structures and Mirror Imaged Asymmetrical Magnetic Core Shapes for Reduced Writer-Writer Spacing (WWS)," 52 pgs.

\* cited by examiner

COIL ROUTING DESIGNS FOR DUAL AND TRIPLE PERPENDICULAR MAGNETIC RECORDING (PMR) WRITERS

RELATED PATENT APPLICATIONS

This application is related to the following: U.S. Pat. Nos. 9,754,612; 10,311,900; and 10,279,451; which are assigned to a common assignee and herein incorporated by reference in their entirety.

TECHNICAL FIELD

The present disclosure relates to a PMR write head configured to have two or three writers per slider and a reduced coil footprint width that is compatible with a writer-writer spacing (WWS)<15 microns to enable a reduction in read write offset (RWO) and enhanced area density capability (ADC) when the slider is integrated in a head gimbal assembly (HGA), and where only one or two additional writer pads are used compared with a single writer to provide optimum performance.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing loop and a leading loop. The trailing loop is comprised a trailing shield structure with a front side at the ABS, an uppermost (PP3) trailing shield that arches over the driving coil and connects with a top yoke (TY). The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and that is connected to a return path (RTP) having a front side recessed from the ABS. The RTP extends back to the BGC and enables magnetic flux in the leading loop pathway to return from the leading shield at the ABS and through the BGC to the MP for faster saturation speed, better adjacent trace interference (ATI) and enhanced wide area track erasure (WATE) potential.

Dual write shield (DWS) designs that feature complete leading and trailing loops were invented for adjacent track erasure (ATE) improvement by reducing stray field in side shields and in the leading shield. Accordingly, a PMR head has a great advantage over LMR in providing higher write field, better read back signal, and potentially much higher areal density. With the growing demand for cloud storage and cloud-based network computing, high and ultra high data rate recording becomes important for high-end disk drive applications.

To achieve areal density in a hard disk drive (HDD) beyond 2 terabytes per platter (TBPP) for conventional PMR, dual writer or triple writer designs have been proposed where the best writer is determined during back end testing, and is then paired with a suspension and integrated in a HGA. As WWS is continuously reduced to satisfy more demanding RWO and ADC requirements, there is a need to simultaneously minimize the size of the coil footprint in the cross-track (width) direction. Furthermore, all writer and coil design improvements should be made with consideration for limiting the number of additional pads to one or two thereby allowing flexibility in dynamic fly height (DFH) heater designs to enable optimum writer performance and a simplification of the fabrication process.

SUMMARY

One objective of the present disclosure is to provide a coil design for dual or triple PMR writers that is compatible with multiple base writer structures and that requires a minimum number of additional pads compared with a single PMR writer.

Another objective of the present disclosure is to provide a coil design according to the first objective that allows the multiple PMR writers to have the same base structure and to be simultaneously fabricated during the same sequence of steps that are used to build a single PMR writer.

These objectives are achieved by configuring a dual PMR writer (two writers per slider) with a base writer structure having one of four layouts. According to one embodiment, there is a nDWS design wherein the trailing loop is intact but the leading loop terminates at the leading shield at the ABS. In a rDWS-no BGC embodiment, the nDWS design is modified with the extension of the leading loop to include a return path (RTP) layer but omitting the BGC. There are also rDWS-BGC and DWS-BGC designs that have complete leading and trailing loops. Each of the writers may have pancake coils or helical coils to energize a main pole therein.

In all designs, there is a cross-track distance at the ABS known as writer-writer spacing (WWS) between the centers of two adjacent main pole tips that is preferably ≤15 microns such that the RWO is minimized when there is a single reader or double reader formed a down-track distance below the main poles and at a center plane that separates the two adjacent PMR writers.

According to a first embodiment relating to a dual PMR writer, each of the driving (top) coils and bucking (bottom) coils has a pancake (1T) shape, and the coils in the first writer are fully separated from the coils in the second writer. A W1+ writer pad is connected to a top coil while a W1− writer pad is connected to the bottom coil in the first writer. In the second writer, there is a W2+ pad connected to the top coil and a W2− pad connected to the bottom coil for a total of two additional pads compared with a single writer.

According to a second embodiment, the coil layout in the first embodiment is modified such that the two bottom coils are joined at the center plane, and are linked to a common W− pad which means only one additional writer pad is needed for the dual PMR writer compared with a single PMR writer. Alternatively, the first embodiment is modified so that the top coils are joined at the center plane and connected to a common W− pad while separate bottom coils are retained.

In a third embodiment, the first embodiment is modified to replace the bottom coils with a common bottom coil that is linked to a W− writer pad. The common bottom coil may have essentially the same width as the footprint width of the two top coils. Thus, a first write current to energize the first writer, or a second write current to energize the second writer is carried through the common bottom coil.

According to a fourth embodiment relating to a triple PMR writer, each of the top coils are fully separated and connect to a separate W+ writer pad. However, the bottom coils are joined at a first center plane between the first and second writers, and at a second center plane between the second a third writers and are connected to a common W− writer pad for a total of two additional writer pads compared with a single PMR writer. Alternatively, each of the bottom coils may be separated and linked to a separate W+ pad while the top coils are joined at the first and second planes and connected to a common W− writer pad.

In a fifth embodiment, the joined bottom coils in the fourth embodiment are replaced with a common bottom coil that is connected to the common W− pad.

There is a sixth embodiment wherein the fully separated pancake coils in the first embodiment are replaced with fully separated helical coils. In each writer, the top coil is connected to the bottom coil through a side tap. Thus, a total of four writer pads (two more than a single PMR writer) is maintained.

In a seventh embodiment, the sixth embodiment is modified to provide a common side tap between a single top coil and a single bottom coil each with two sides that are mirror images of each other with respect to the center plane.

According to an eighth embodiment, the sixth embodiment is modified so that the bottom helical coils are joined at the center plane and are connected to a common pad that can serve as either a W1+ pad for a first write current to energize the first writer, or a W2− pad for a second write current to energize the second writer. In a ninth embodiment, the eighth embodiment is modified to have separate bottom coils, and joined top coils that are linked to a W2+/W1− pad.

Preferably, each writer in the dual or triple PMR writer has the same base structure, and the dual or triple PMR writer is fabricated with the same number of process steps used to build a single writer in order to minimize production cost.

DETAILED DESCRIPTION

Figure 1:
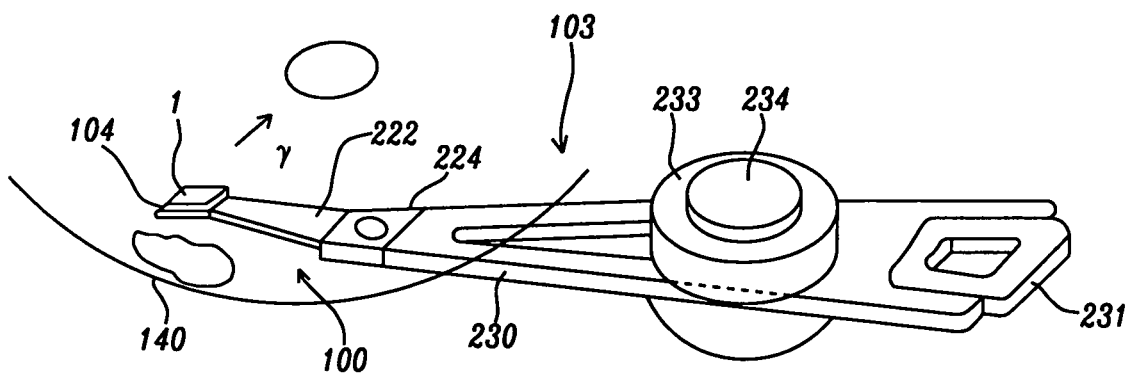
FIG. 1 is a perspective view of a head arm assembly of the present disclosure.

The present disclosure relates to dual or triple PMR writer schemes featuring coil designs having a total footprint width that enables writer-writer spacing (WWS) <15 microns at the ABS thereby providing an acceptable RWO for enhanced ADC. In addition, only one or two additional writer pads are used to accommodate the dual or triple PMR writers compared with a single PMR writer layout to provide flexibility in allowing separate pads to control a dynamic fly height (DFH) heater in each writer. In the drawings, width is in the y-axis (cross-track) direction, thickness is in the z-axis (down-track) direction, and a height dimension is in the x-axis direction that is orthogonal to the ABS and towards a back end of the device. The terms "top coil" and "driving coil" may be used interchangeably, and the terms "bottom coil" and "bucking coil" may be used interchangeably.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
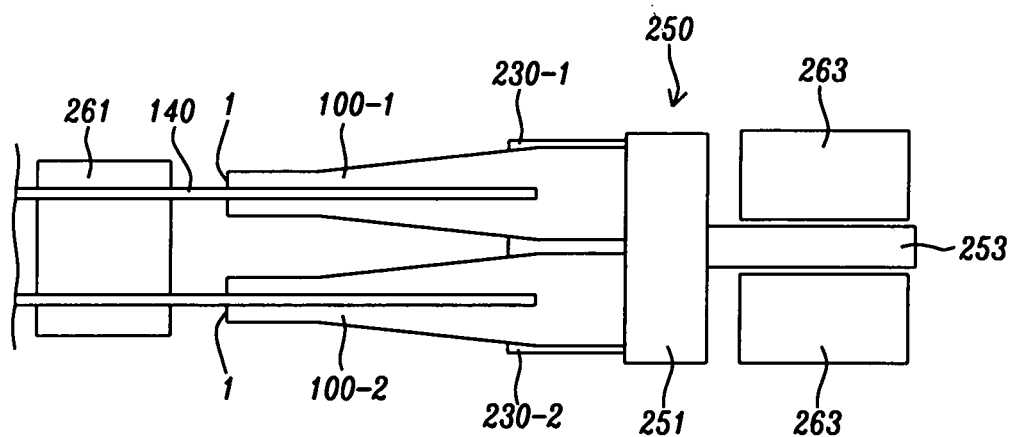
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion 253 of the voice coil motor is mounted at the opposite side of each arm in carriage 251. The voice coil motor has a permanent magnet 263 arranged at an opposite position across the coil 253.

Figure 3:
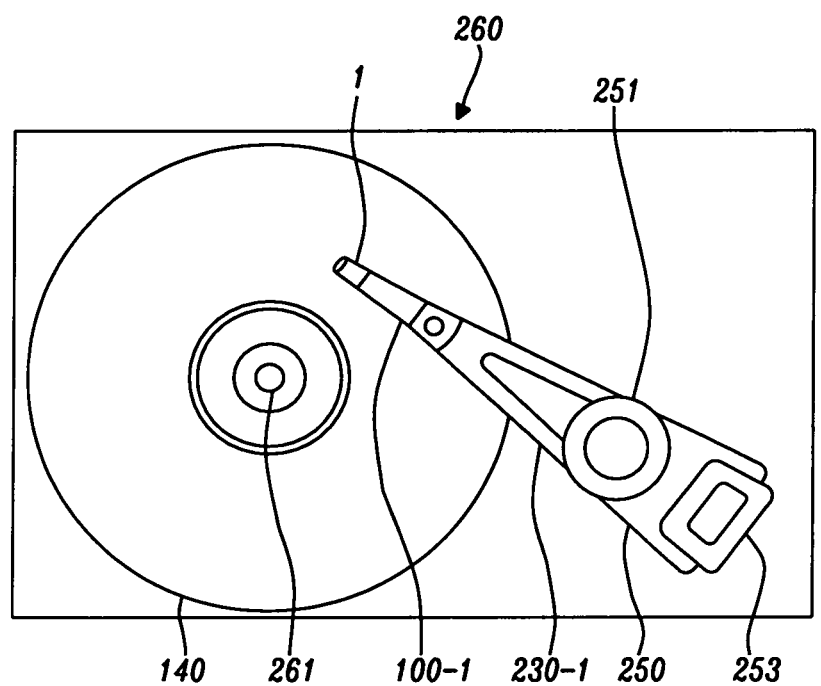
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
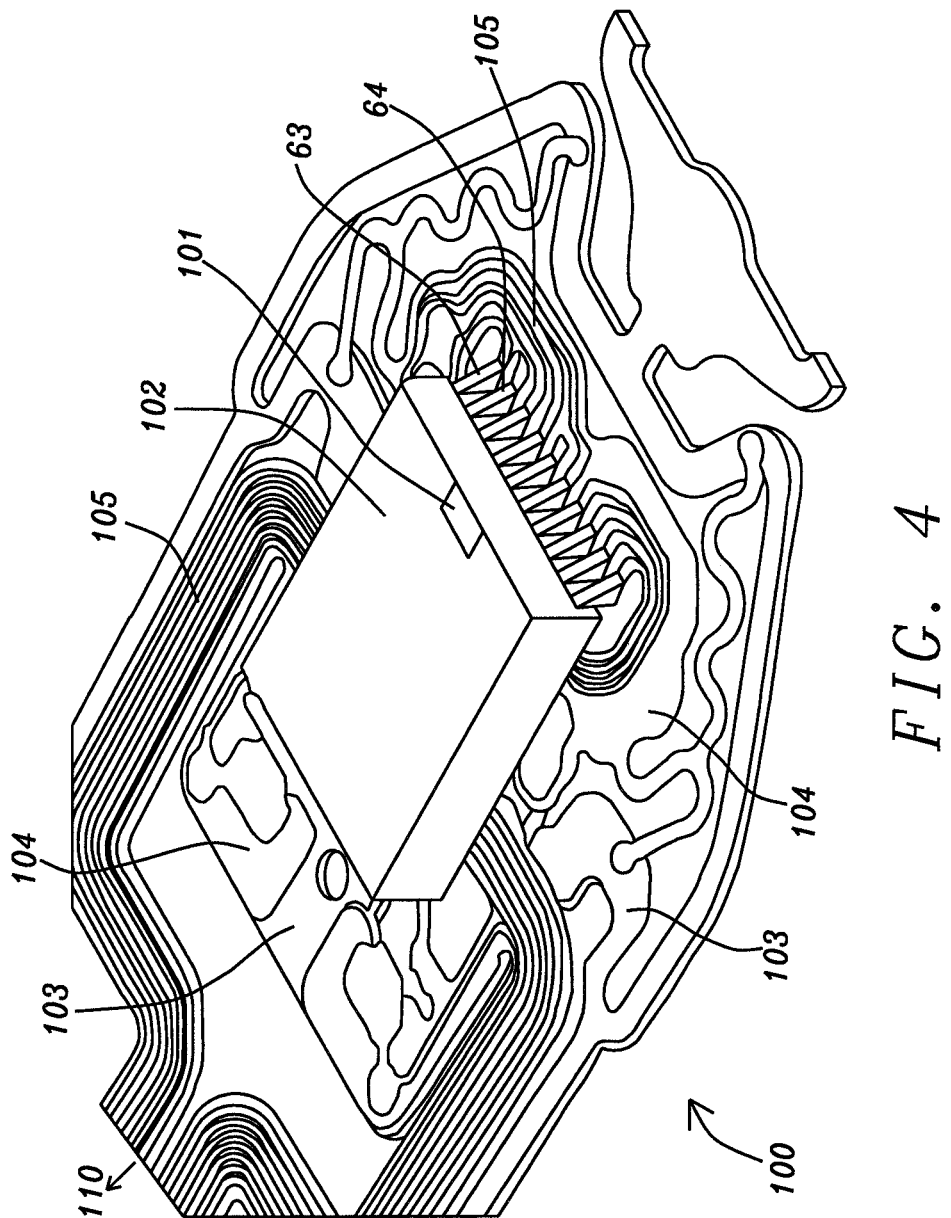
FIG. 4 is an oblique view of a slider on which a combined read/write head structure is mounted, and having adjoining pads and trace lines (wiring) formed on a suspension according to an embodiment of the present disclosure.

Referring to FIG. 4, HGA 100 is depicted and features suspension 103, an overlying dielectric layer 104, and slider 102 formed thereon. The magnetic recording head 1 in FIG. 1 may be comprised of a combined read/write head 101 wherein the dual or triple PMR writer structure of the present disclosure adjoins a top side of the slider facing away from the suspension. A plurality of pads including pads 63, 64 are employed to control a current to the bucking coil, driving coil, DFH heaters, sensors, and one or more readers in the combined read/write head. Trace lines 105 connect the plurality of pads to preamp 110. Connections between the pads and the dual PMR writer components are within the slider and not visible from this view.

Figure 5:
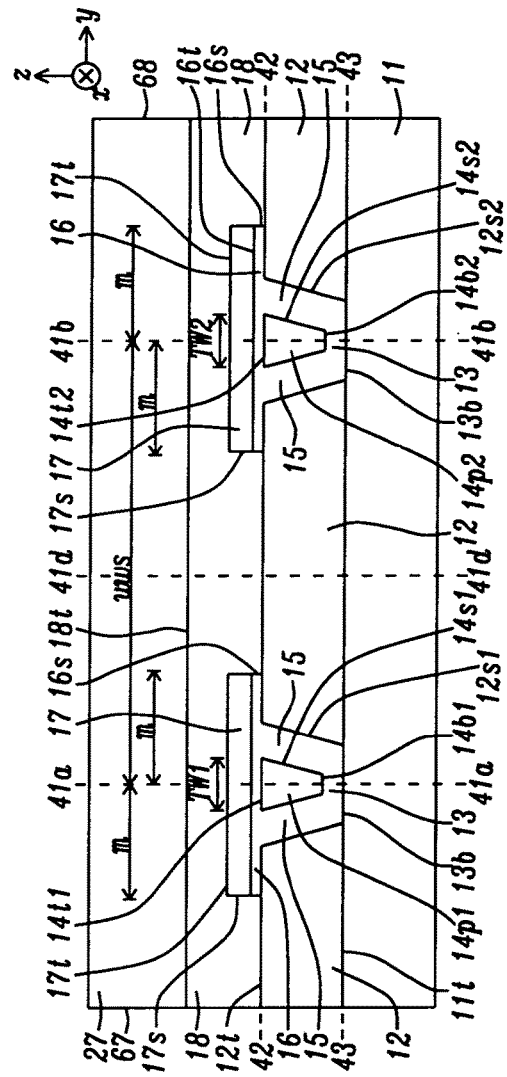
FIG. 5 is an ABS view of a dual PMR writer scheme wherein two main poles have a cross-track writer-writer spacing (WWS), and share a trailing shield and leading shield at the ABS according to an embodiment of the present disclosure.

In FIG. 5, an ABS view is illustrated of a dual PMR writer structure according to one embodiment of the present disclosure where the first PMR writer has a first main pole tip 14$p$1 and track width TW1 that are bisected by plane 41$a$-41$a$, and the second PMR writer has a second main pole tip 14$p$2 and track width TW2 that are bisected by plane 41$b$-41$b$. Center plane 41$c$-41$c$ separates the two PMR writers, is equidistant from and parallel to planes 41$a$-41$a$ and 41$b$-41$b$, and is orthogonal to the ABS. WWS is the cross-track distance between plane 41$a$-41$a$ and plane 41$b$-41$b$. First and second main pole tips are shown with a trapezoidal shape but may have different shapes in other embodiments. Trailing edges 14$t$1, 14$t$2 of the first and second main pole tips, respectively, are formed on plane 42-42 that is orthogonal to the center plane.

In the exemplary embodiment, the main pole layers share a trailing shield 18, and leading shield 11, and each have a pole tip 14$p$1, 14$p$2 that is surrounded by a gap layer comprising leading gap 13 with bottom surface 13$b$, side gaps 15, and a write gap 16 with top surface 16$t$. There is a first trailing shield (hot seed) layer 17 overlying each write gap. Note that the trailing shield structure further includes a PP3 trailing shield 26 (FIGS. 7-10) that forms a magnetic connection between top surface 18$t$ of trailing shield 18 and top yoke (TY) 36$a$ in the first PMR writer (and TY 36$b$ in the second PMR writer).

Returning to FIG. 5, each write gap 16/hot seed layer 17 stack has planar sides 16$s$/17$s$ formed a distance m from plane 41$a$-41$a$ in the first PMR writer, and an equivalent distance m from plane 41$b$-41$b$ in the second PMR writer. First and second main pole tips have sides 14$s$1 and 14$s$2, respectively, and top edges 14$t$1 and 14$t$2, respectively, which are formed at plane 42-42 that also includes a top surface 12$t$ of side shield layers 12. First and second main pole tips also comprise bottom edges 14$b$1, 14$b$2, respectively. Leading shield 11 has a top surface 11$t$ at plane 43-43 which also includes the leading gap bottom surface. Plane 42-42 and plane 43-43 are parallel to each other and are orthogonal to the center plane and to the ABS. Side gaps 15 adjoin inner sides 12$s$1 (first PMR writer) and sides 12$s$2 (second PMR writer) of the side shields. Trailing shield 18 contacts hot seed layer sides 17$s$ and top surfaces 17$t$, and write gap sides 16$s$, and adjoins side shields 12 at plane 42-42. The all wrap around (AWA) shield design has outer sides 67, 68, and features side shields that adjoin the leading shield at plane 43-43.

In all embodiments, WWS is preferably ≤15 microns so that RWO represented here as the cross-track distance (WWS/2) between main pole tip 14p1 and center plane 41d-41d between the first PMR writer and second PMR writer, and the cross-track distance (WWS/2) between main pole tip 14p2 and the center plane 41d-41d at the ABS is minimized. Smaller RWO is always preferred for less track misregistration and better ADC.

The present disclosure anticipates that one or more dynamic fly height (DFH) heaters may be formed in one or more insulation (dielectric) layers in a dual PMR writer structure as described in related U.S. Pat. No. 10,279,451 to control the extent of thermal expansion (protrusion) at the ABS and toward a magnetic medium during a read or write process. Read gap (RG) and write gap (WG) protrusion may be tuned by the placement of the one or more DFH heaters, and by the choice of metal or alloy selected for the DFH heaters since each DFH heater is comprised of a resistor material with a particular thermal and mechanical response to a given electrical input.

Figure 6:
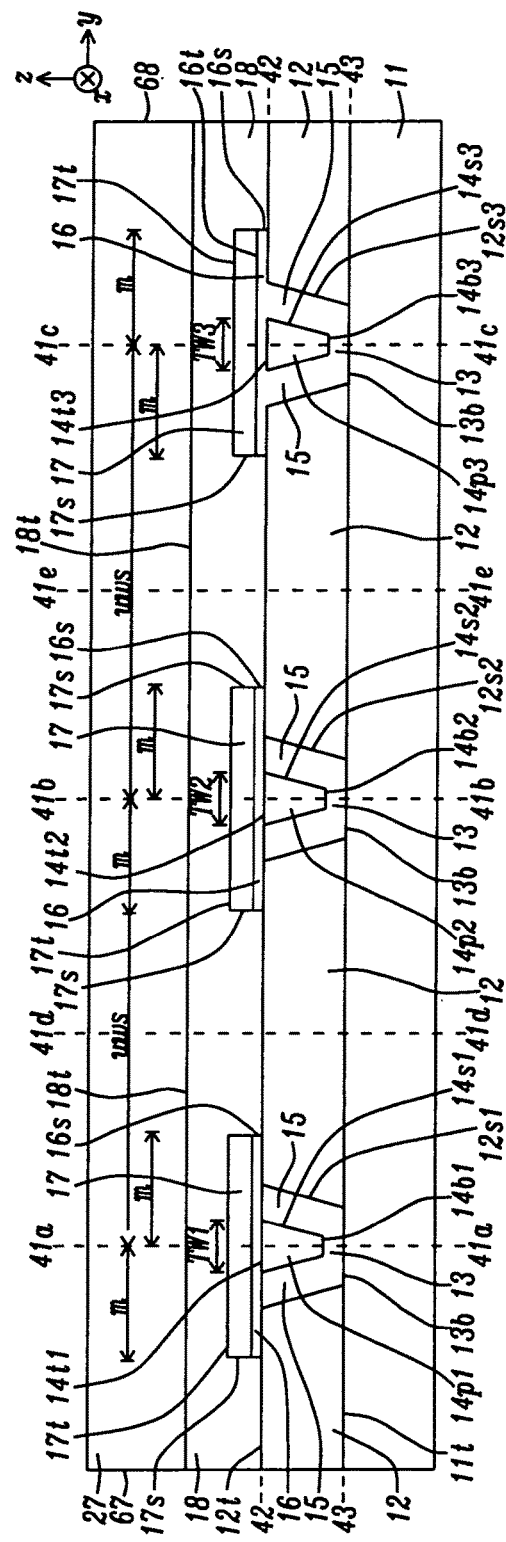
FIG. 6 is an ABS view of a triple PMR writer scheme wherein adjacent main poles are separated by spacing (WWS), and share a trailing shield and leading shield at the ABS according to an embodiment of the present disclosure.

Referring to FIG. 6, an ABS view of a triple PMR writer is depicted. According to one embodiment that represents a modification of the dual PMR writer in FIG. 5, a third PMR writer with pole tip 14p3, track width TW3, and bisected by plane 41c-41c is formed on an opposite side of the second PMR writer with respect to the first PMR writer. Pole tip 14p3 has top (trailing) edge 14t3, sides 14s3, and bottom edge 14b3. Preferably, WWS between the first and second PMR writers is essentially the same as WWS between the second and third PMR writers. Otherwise, all aspects relating to shield structure and gap layers in FIG. 5 also apply to the third PMR writer in FIG. 6. A second center plane 41e-41e separates the third PMR writer from the second PMR writer. Side shields 12 in the third PMR writer have inner sides 12s3.

Figure 7:
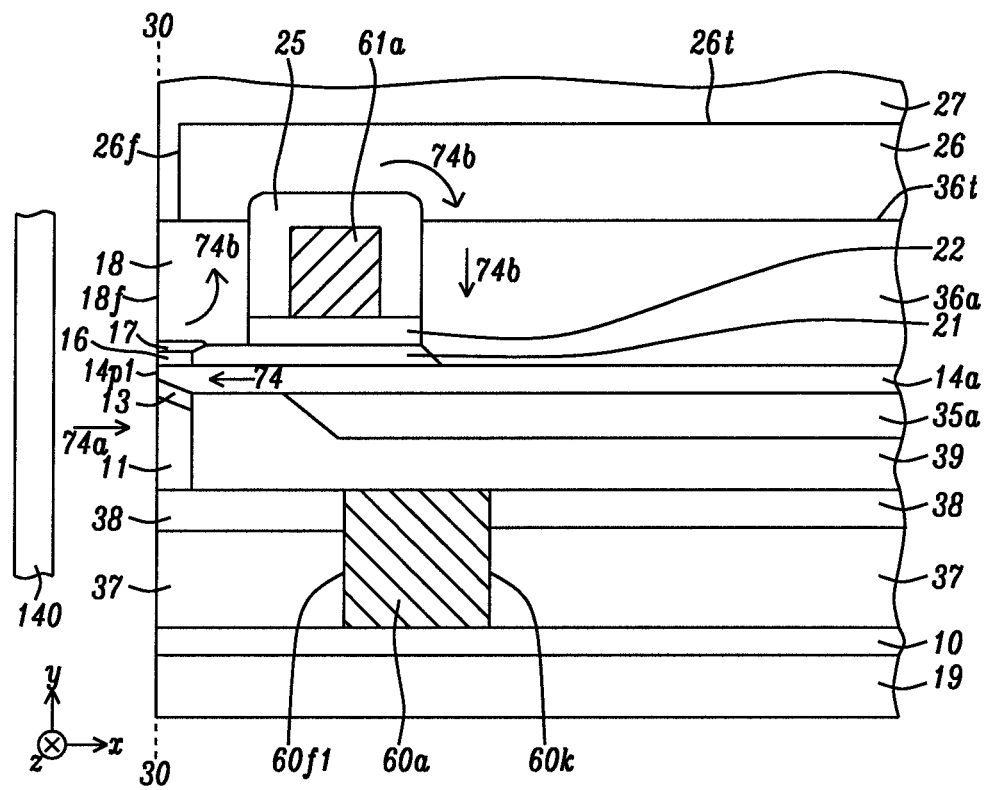
FIG. 7 is a down-track cross-sectional view of a dual PMR writer having a non-DWS (nDWS) layout wherein the leading loop for magnetic flux return terminates at the leading shield according to an embodiment of the present disclosure.

Referring to FIG. 7, the write head portion of a dual PMR writer is illustrated according to one embodiment of the present disclosure. The down-track cross-sectional view is taken along plane 41a-41a in the first PMR writer. However, a similar cross-sectional view is available at plane 41b-41b in the second PMR writer, or at plane 41c-41c in the third PMR writer in FIG. 6, and represents a modified version of the nDWS design disclosed in related U.S. Pat. No. 9,754,612. The nDWS approach is beneficial in providing better return field at the pole tip trailing edge thereby improving field gradient, BER, and ADC compared with a DWS scheme. The read head is omitted to simplify the drawing and to focus on the leading and trailing loops for magnetic flux return to the main pole (MP) 14a with pole tip 14p1 in the first PMR writer (or MP 14b with pole tip 14p2 in the second PMR writer, or MP 14c with pole tip 14p3 in the third PMR writer). Note that each of the insulation layers described hereinafter may be comprised of one or multiple layers. Bucking coil 60a (and bucking coil 60b in the second PMR writer, and bucking coil 60c in the third PMR writer) is recessed from the ABS 30-30 and formed on insulation layer 10, which in turn is formed on bottommost insulation layer 19. A second stack of layers including insulation layer 37 and overlying insulation layer 38 is formed between the bucking coil front side 60f1 and ABS, and also adjoins a backside 60k thereof.

Leading shield 11 is formed on insulation layer 38 at the ABS. Note that the leading loop for flux return 74a terminates at the leading shield since the return path (RTP) and BGC found in other embodiments to be described later are omitted here. Another insulation layer 39 extends from a backside of the leading shield towards a back end of the PMR writer and contacts a top surface of insulation layer 38. Tapered bottom yoke (tBY) 35a, MP 14a, and TY 36a are sequentially formed on insulation layer 39. Lead gap 13 and write gap 16 are below and above each MP, respectively, at the ABS.

The trailing loop comprises hot seed layer 17, trailing shield 18 with front side 18f at the ABS 30-30, PP3 trailing shield 26 with front side 26f that is shown recessed from the ABS in the drawing but can be exposed at the ABS as well, and TY 36a with top surface 36t adjoining the PP3 trailing shield behind driving coil 61a (and TY 36b behind driving coil 61b in the second PMR writer, and TY 36c behind driving coil 61c in the third PMR writer) so that magnetic flux 74b from magnetic medium 140 is able to return to MP 14a, MP 14b, and MP 14c, respectively. The driving coil is formed on a stack of insulation layers 21/22 and is surrounded on the sides and top surface with insulation layer 25. In some embodiments as shown in related U.S. Pat. No. 9,754,612, the PP3 trailing shield top surface arches over the driving coil instead of having a flat top surface 26t. A protection layer 27 covers the PP3 trailing shield and is made of an insulating material such as alumina.

Figure 8:
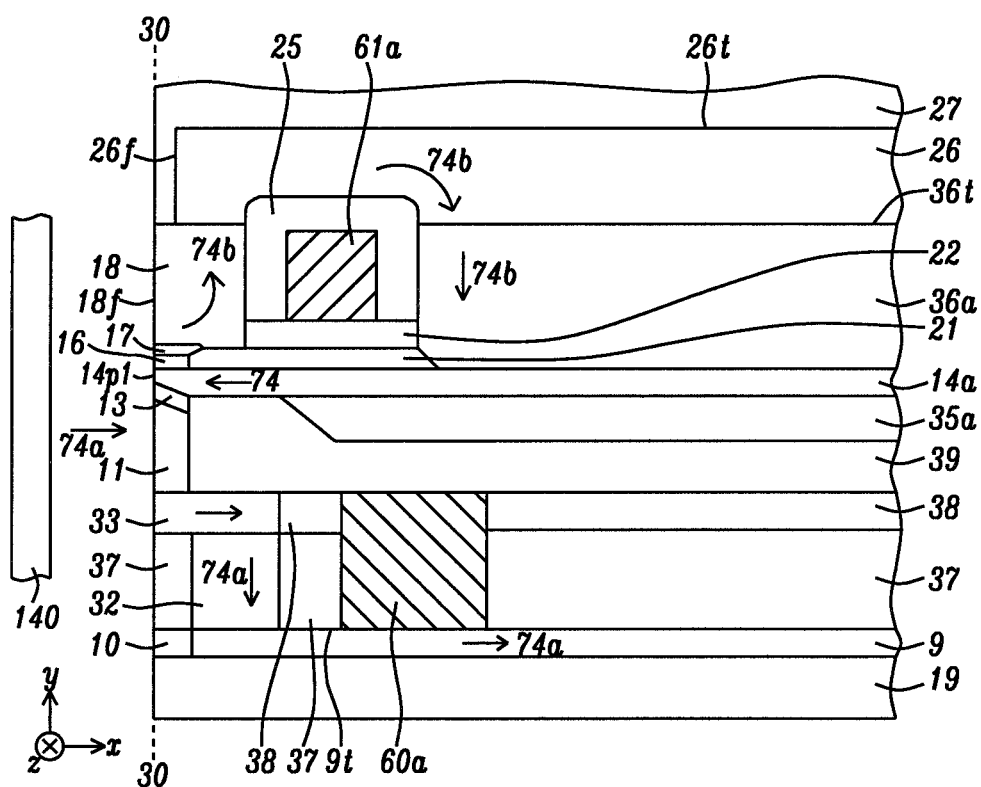
FIG. 8 is a down-track cross-sectional view of a dual PMR writer having a rDWS non-BGC layout in which the back gap connection is omitted in the magnetic flux leading loop according to an embodiment of the present disclosure.

In an alternative embodiment depicted in FIG. 8 and referred to as a rDWS-no BGC base structure, all layers in the writer structure described in the previous embodiment are retained. Moreover, the leading loop is extended to include a LSB magnetic layer 33 contacting a bottom surface of leading shield 11, and that replaces a front portion of insulation layer 39 at the ABS but does not extend to the bucking coil 60a. The expanded leading loop also includes S2C connector 32 contacting a bottom surface of LSB 33 and a top surface 9t of RTP 9, and where the S2C connector is separated from the ABS by insulation layer 37. The RTP layer is recessed from the ABS and formed within insulation layer 10. Therefore, magnetic flux 74a may now proceed into the RTP but there is still no BGC to enable magnetic flux to reach the tBY 35a (or the tBY in the second PMR writer or the tBY in the third PMR writer that are not shown). This embodiment has the same advantage as the nDWS base structure in the previous embodiment in terms of a better return field at each MP trailing edge.

Figure 9:
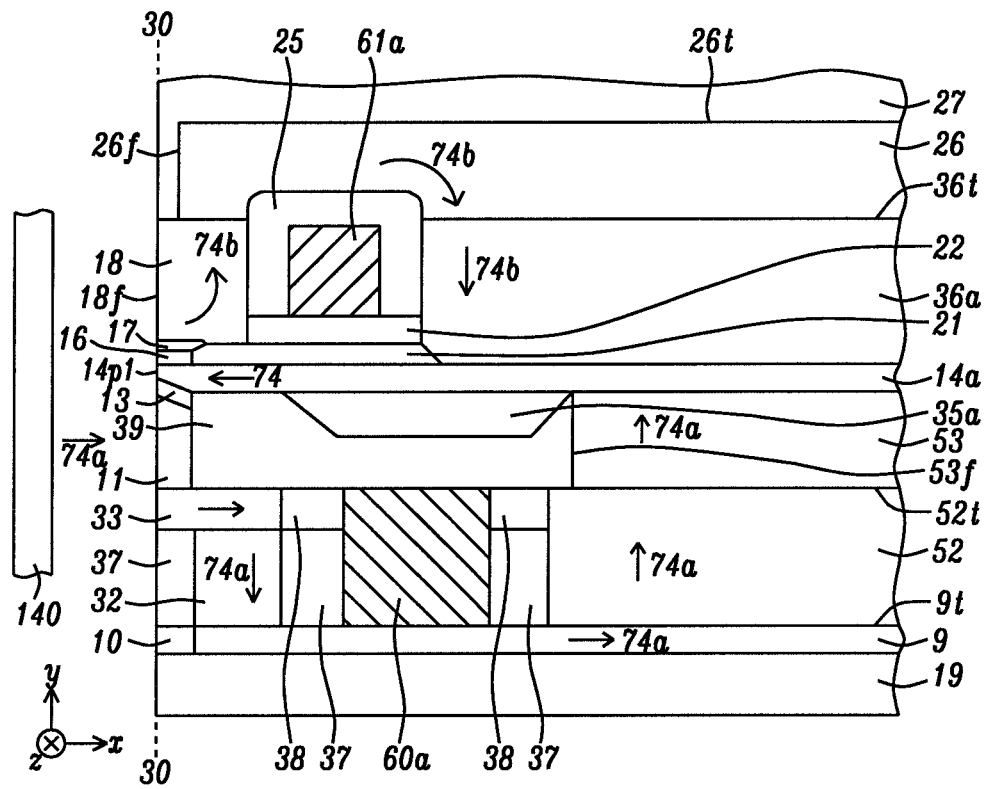
FIG. 9 is a down-track cross-sectional view of a dual PMR writer with a rDWS BGC layout wherein the back gap connection (BGC) in the leading loop includes a lower and upper layers according to an embodiment of the present disclosure.

Referring to FIG. 9, another embodiment (rDWS-BGC) is depicted of a base structure suitable for a dual or triple PMR writer of the present disclosure. Here, both of the trailing loop with magnetic flux 74b, and leading loop with magnetic flux 74a are complete. All layers are retained from the previous embodiment in FIG. 8, and with the addition of a lower back gap (LBG) layer 52 formed on top surface 9t of RTP 9, and BGC 53 on LBG top surface 52t. The tBY 35a, tBY 35b, and tBY 35c are formed within insulation layer 39 and closer to ABS 30-30 than BGC front side 53f. Thus, the BGC contacts a bottom surface of MP 14a behind tBY 35a while a second BGC contacts a bottom surface of MP 14b behind tBY 35b, and a third BGC adjoins a bottom surface of MP 14c behind tBY 35c.

Figure 10:
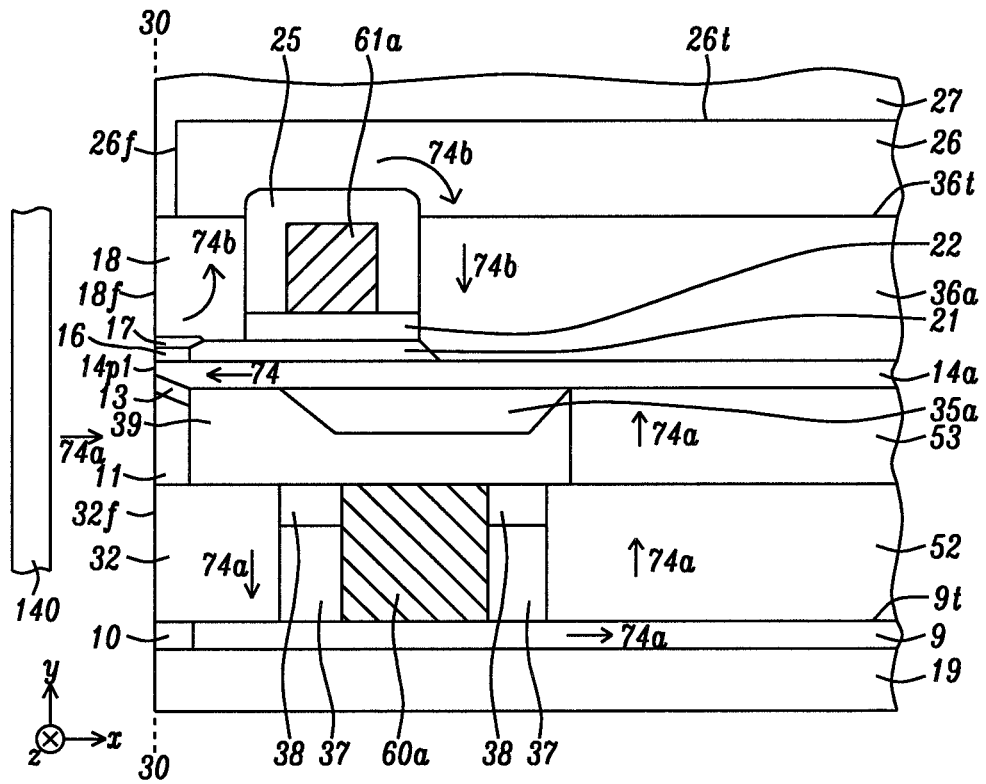
FIG. 10 is a down-track cross-sectional view of a dual PMR writer with a DWS BGC design in which the leading shield is extended at the ABS according to another embodiment of the present disclosure.

In FIG. 10, a fourth base structure known as DWS BGC and suitable for a dual or triple PMR writer of the present disclosure is depicted and represents a modification of the previous embodiment in FIG. 9. In particular, LGB 33 and a front portion of insulation layer 37 at the ABS are replaced with an enlarged S2C connector 32 such that a front side 32f thereof is at the ABS 30-30. Effectively, the leading shield is extended downward so that magnetic flux 74a may enter both of leading shield 11 and the S2C connector at the ABS.

In all of the embodiments shown in FIGS. 7-10, two or three PMR writers may be fully separated with separate PP3 trailing shield 26, write shields 17/18, leading shield 11, LSB 33, S2C connector 32, RTP 9, LBG 52, and BGC 53 as well as MP 14a, tBY 35a, and TY 36a in the first PMR writer separated from MP 14b, tBY 35b and TY 36b, respectively, in the second PMR writer. Magnetic core components in the second PMR writer are separated from MP 14c, tBY 35c, and TY 36c when a third PMR writer is present. In another embodiment, PP3 trailing shield 26, write shields 17/18, leading shield 11, LSB 33, S2C 32, and the RTP are shared while first and second PMR writers (and a third PMR writer when present) have separate LBG, BGC, tBY, TY, and MP. In yet another embodiment, all components in the leading and trailing loops are shared except for tBY 35b in the second PMR writer that is separated from tBY 35a in writer the first PMR writer, and from tBY 35c in the third PMR writer. Moreover, MP 14b is separated from MP 14a and MP 14c, and TY 36b is separated from TY 36a, and from TY 36c.

Leading shield 11, LSB 33, S2C 32, BGL 52, BGC 53, and RTP 9 are generally made of NiFe, CoFe, CoFeNi or the like with a saturation magnetization value of 10 kiloGauss (kG) to 16 kG. Hot seed layer 17, main poles, and tapered bottom yokes typically have a saturation magnetization value from 19 kG to 24 kG. Top yokes, trailing shield 18, and the PP3 trailing shield 26 are typically made of materials with a 16 kG to 19 kG magnetic saturation value. The base structures shown in FIGS. 7-10 preferably have well known 1+1T designs for bucking coils and driving coils.

In writers with pancake coil designs depicted in FIGS. 13-25, an interconnect (not shown) is formed behind the TY/MP/tBY stack of layers to form an electrical connection between the bucking coil and driving coil in each PMR writer thereby enabling a write current to generate magnetic flux 74 in MP 14a for the first PMR writer, in MP 14b for the second PMR writer, and in MP 14c for the third PMR writer in a triple PMR writer structure. It should be understood that alternative write head designs may be employed other than those shown in FIGS. 7-10 without limiting the advantages of the present disclosure. Examples of alternative dual PMR writer designs are disclosed in related U.S. Pat. No. 10,279,451.

Figure 11:
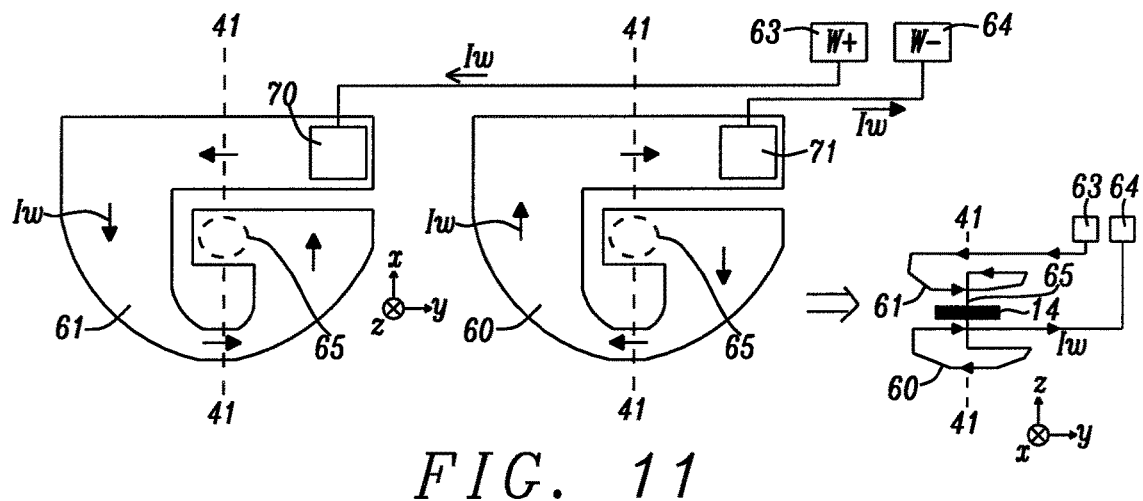
FIGS. 11-12 are top-down views of a single writer with pancake coils and helical coils, respectively, each connected to two writer pads.

Referring to FIG. 11, a single PMR writer previously fabricated by the inventors is illustrated and includes a single driving coil 61 having a contact 70 that is connected to a W+ writer pad 63. There is also a single bucking coil 60 with a contact 71 that is connected to W− writer pad 64. Thus, a write current is able to flow from the W+ writer pad in a counterclockwise direction through the driving coil to interconnect 65 (that is bisected by plane 41-41) and then in a clockwise direction through the bucking coil to the W− pad to energize the PMR writer. Only two writer pads are required. A schematic drawing of the single PMR writer is provided on the right side of the drawing and shows main pole 14 formed between the bucking coil and driving coil at plane 41-41.

Figure 12:
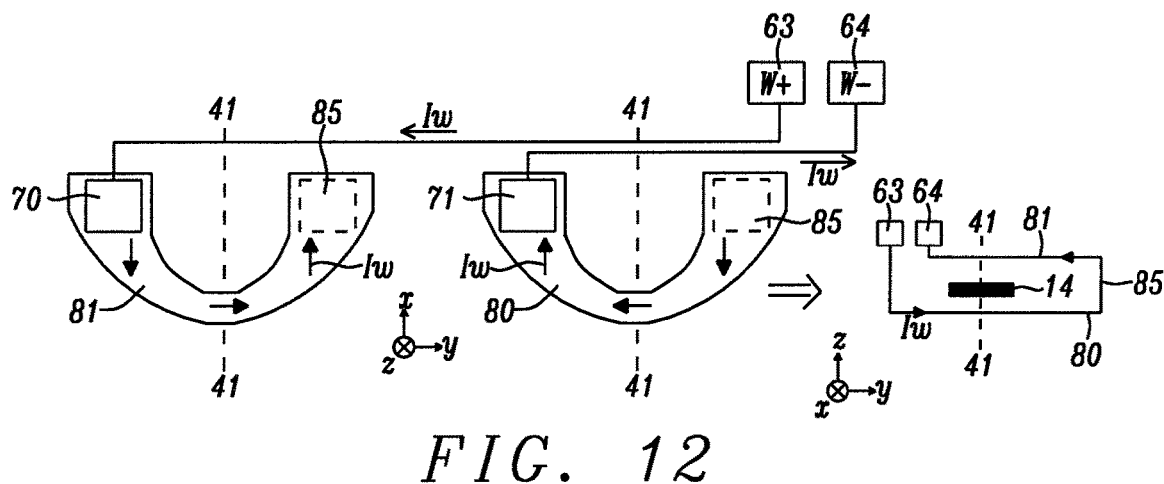

In an alternative embodiment shown in FIG. 12, the single PMR writer may have helical driving coil 81 and a helical bucking coil 80 each bisected by plane 41-41, and that are connected to W+ pad 63 and W− pad 64, respectively. Contact 70 is on a first side of the driving coil while a side tap 85 adjoins the other side of the driving coil. Likewise, contact 71 is on one side of the bucking coil while the side tap 85 adjoins the other side of the bucking coil. Again, a write current Iw flows counterclockwise in the driving coil and clockwise within the bucking coil, and only two writer pads are required. A schematic drawing of the single PMR writer is provided on the right side of the drawing and shows main pole 14 formed between the bucking coil and driving coil at plane 41-41.

Figure 13:
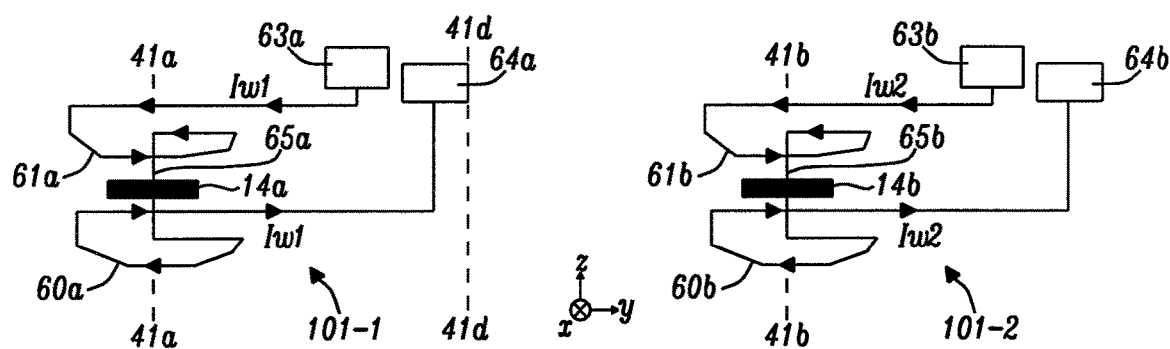
FIG. 13 is a schematic drawing of a dual PMR writer having two fully separated pancake driving and pancake coils each attached to a writer pad according to a first embodiment of the present disclosure.

Referring to FIG. 13, a schematic drawing of a first embodiment of the present disclosure is shown of a dual PMR writer having a first PMR writer 101-1 formed on one side of center plane 41d-41d, and a second PMR writer 101-2 on the opposite side of the center plane on a slider (not shown). When the first PMR writer is selected for a write process, a first write current Iw1 from W1+ writer pad 63a flows through driving coil 61a before entering first interconnect 65a and then passes through bucking coil 60a to W1− writer pad 64a to energize main pole 14a that is bisected by plane 41a-41a. When the second PMR writer is selected for a write process, a second write current Iw2 from W2+ writer pad 63b flows through driving coil 61b before entering second interconnect 65b, and then passes through bucking coil 60b to W2− writer pad 64b to energize main pole 14b at plane 41b-41b. The driving coils and bucking coils are fully separated and have a pancake design. Here a total of four writer pads are needed to functionalize the dual PMR writer structure. Iw1 or Iw2 exiting a top or bottom coil is also referred to as "output" current, and Iw1 or Iw2 entering a top or bottom coil is also known as "input" current.

Figure 14:
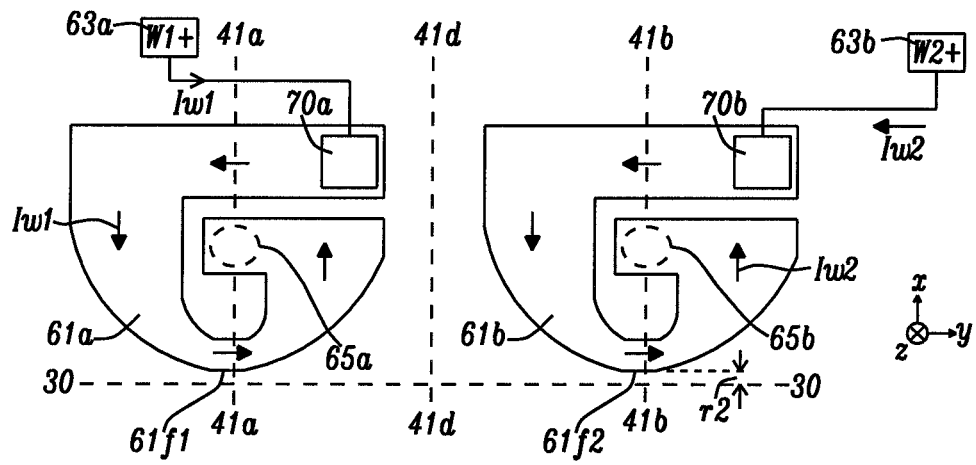
FIGS. 14-15 are top-down views of two driving coils and two bucking coils, respectively, in the dual PMR writer in FIG. 13.

In FIG. 14, a top-down view of the driving coil design in the first embodiment is shown. Write current Iw1 flows in a counterclockwise direction from contact 70a to interconnect 65a in driving coil 61a, and write current Iw2 flows counterclockwise from contact 70b to interconnect 65b in driving coil 61b. Front sides 61/1, 61/2 of the driving coils are recessed from the ABS 30-30 by a distance r2.

Figure 15:
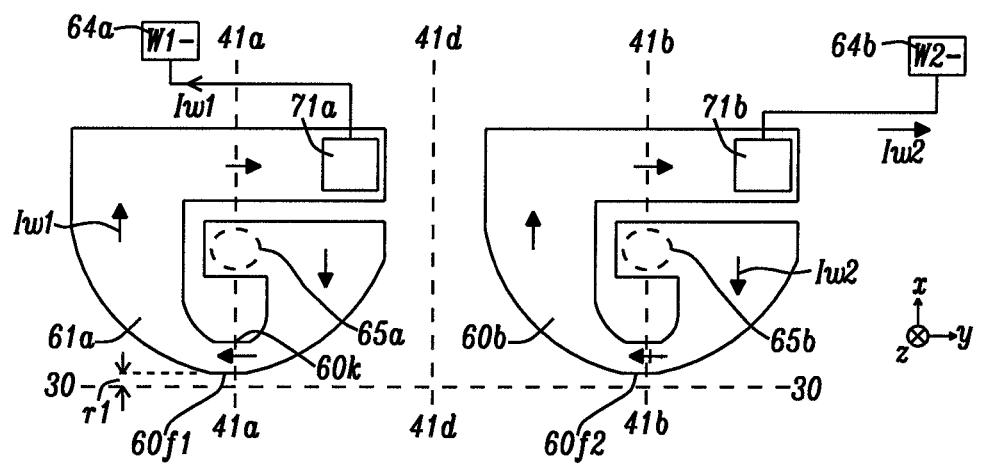

FIG. 15 depicts a top-down view of the bucking coil design in the first embodiment. Write current Iw1 flows in a clockwise direction from interconnect 65a to contact 71a in bucking coil 60a, and write current Iw2 flows clockwise from interconnect 65b to contact 71b in bucking coil 60b. Front sides 60/1, 60/2 of the bucking coils are recessed from the ABS 30-30 by a distance r1.

Figure 16:
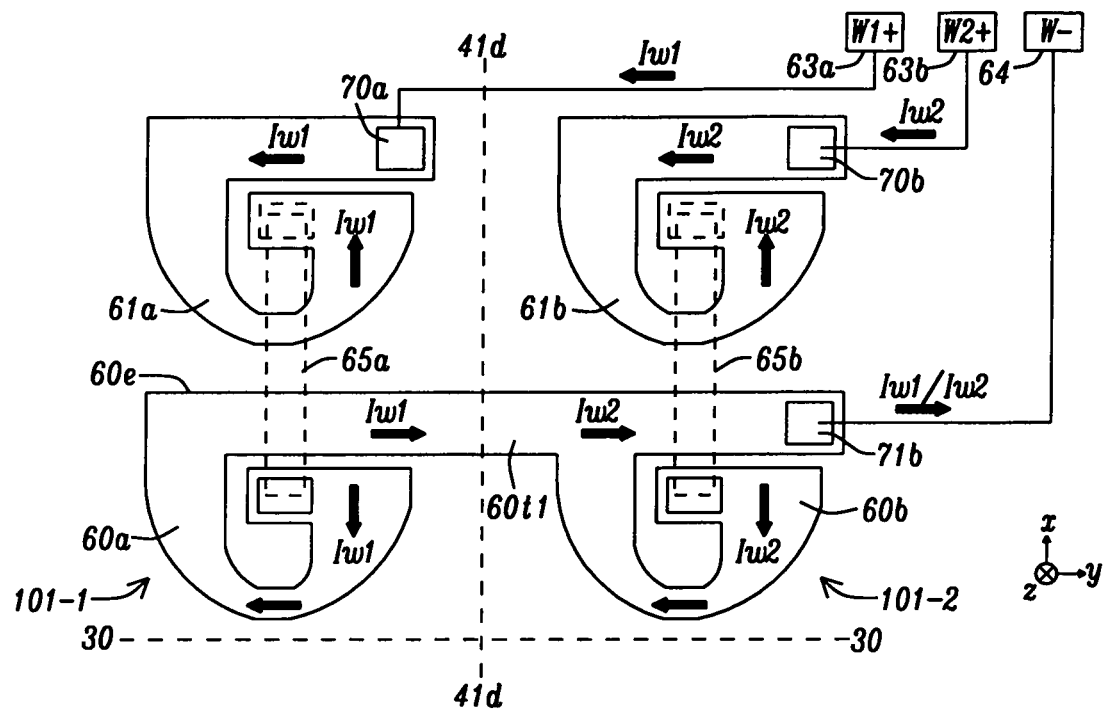
FIG. 16 is a top-down view and FIG. 17 is a schematic drawing of a dual PMR writer with separate pancake driving coils, and where the bucking coils are connected to a common W− pad according to a second embodiment of the present disclosure.

In FIG. 16, a second embodiment of the present disclosure is shown from an oblique view and represents a modification of the first embodiment where the bucking coils 60a, 60b are joined at a backside 60e with a bridge 60t1 across center plane 41d-41d. In this case, the write current path in the driving coils is the same as in the first embodiment. However, write current 1w1 flows clockwise through bucking coil 60a and across bridge 60t1 to contact 71b on bucking coil 60b before exiting to a common W− pad 64 in the second embodiment. Write current Iw2 flows clockwise through bucking coil 60b to contact 71b and then to common W− pad 64. With this design, the total number of writer pads is reduced from four to three for a dual PMR writer. It should be understood that in all oblique views depicted in the drawings, the driving coils are recessed from the ABS 30-30 similar to r2 in FIG. 14.

Figure 17:
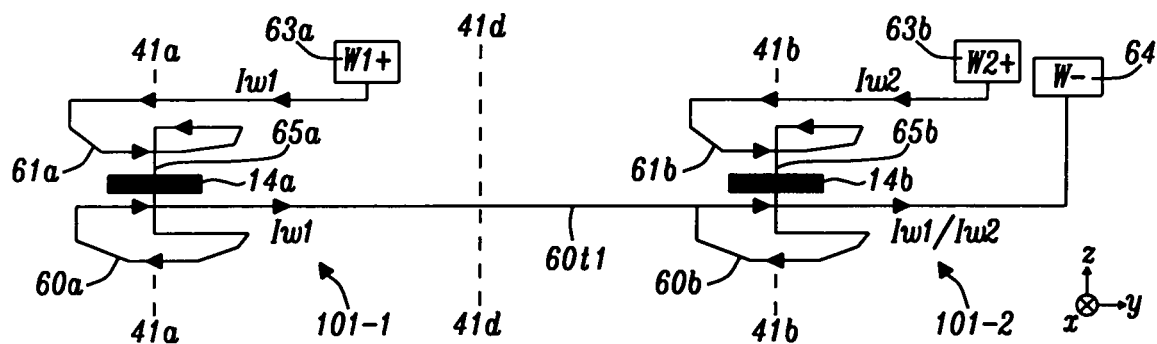

A schematic drawing of the second embodiment is depicted in FIG. 17 and shows first PMR writer 101-1 separated from second PMR writer 101-2 by center plane 41d-41d. Main pole 14a in the first PMR writer is formed between driving coil 61a and bucking coil 60a, and main pole 14b in the second PMR writer is between driving coil 61b and bucking coil 60b. It should be understood that in all of the dual and triple PMR writer embodiments described herein, only one PMR writer is energized during a given time period. Therefore, only write current Iw1 flows when the first PMR writer is selected for writing to a magnetic medium (not shown), or only write current Iw2 flows when the second PMR writer is selected for writing.

Figure 18:
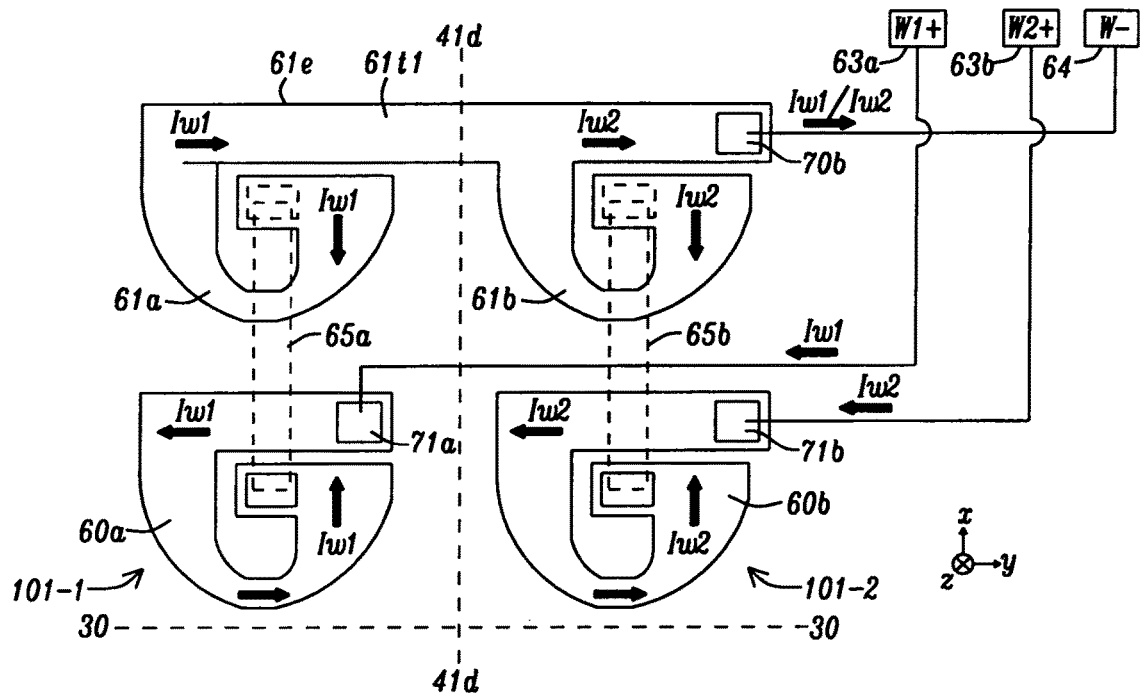
FIG. 18 is a modification of the top-down view in FIG. 16 where the driving coils are connected to a common W− pad, and the bucking coils are fully separated.

An alternative layout to the second embodiment is illustrated in FIG. 18 where the coil design in FIG. 16 is modified by having fully separated bucking coils 60a, 60b, and where the driving coils 61a, 61b are joined at a backside 61e with a bridge 61t1 across center plane 41d-41d. In this scheme, write current Iw1 from W1+ writer pad 63a enters driving coil 60a at contact 71a and flows counterclockwise to interconnect 65a, and then clockwise through driving coil 61a and across bridge 61t1 to contact 70b before exiting to common W− pad 64. Write current Iw2 from W2+ writer pad 63b enters bucking coil 60b at contact 71b and flows counterclockwise to interconnect 65b, and then clockwise through driving coil 61b to contact 70b before exiting to the common W− pad.

In all embodiments described herein relating to dual PMR writers, there may be a single DFH heater coil that is activated to cause write gap protrusion at the ABS simultaneously in both writers, and requiring two heater pads to control the flow of current to and from the coil. Alternatively, dual PMR writers may have one DFH heater coil in the first PMR writer and a second DFH heater coil in the second PMR writer to selectively cause write gap protrusion in the writer used for writing. In this case, the two DFH heater coils share a ground pad, and an additional heater pad is needed for the second DFH coil as explained in related U.S. Pat. No. 10,279,451 where schematic drawings are provided for both of the single and dual DFH coil options.

Figure 19:
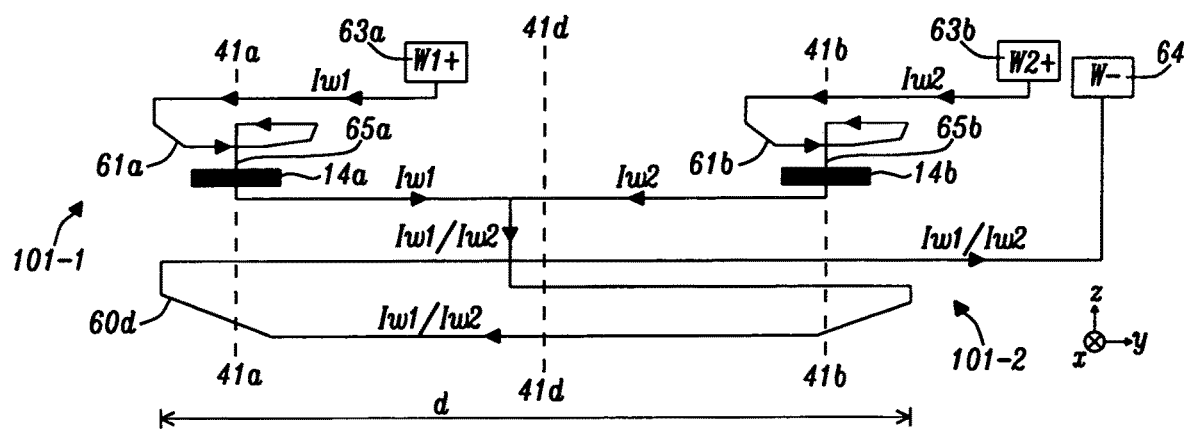
FIG. 19 is a schematic drawing and FIG. 20 is a top-down view of a dual PMR writer with separate pancake driving coils, and a common bucking coil that is connected to a W− pad according to a third embodiment of the present disclosure.

Referring to FIG. 19, a third embodiment of the present disclosure is depicted in a schematic drawing. The writer pads and driving coil layout are retained from the second embodiment shown in FIG. 16 except the bridged bucking coil design is replaced by a common bucking coil 60d having a cross-track width essentially the same as that of a combined footprint width d of the two driving coils.

Figure 20:
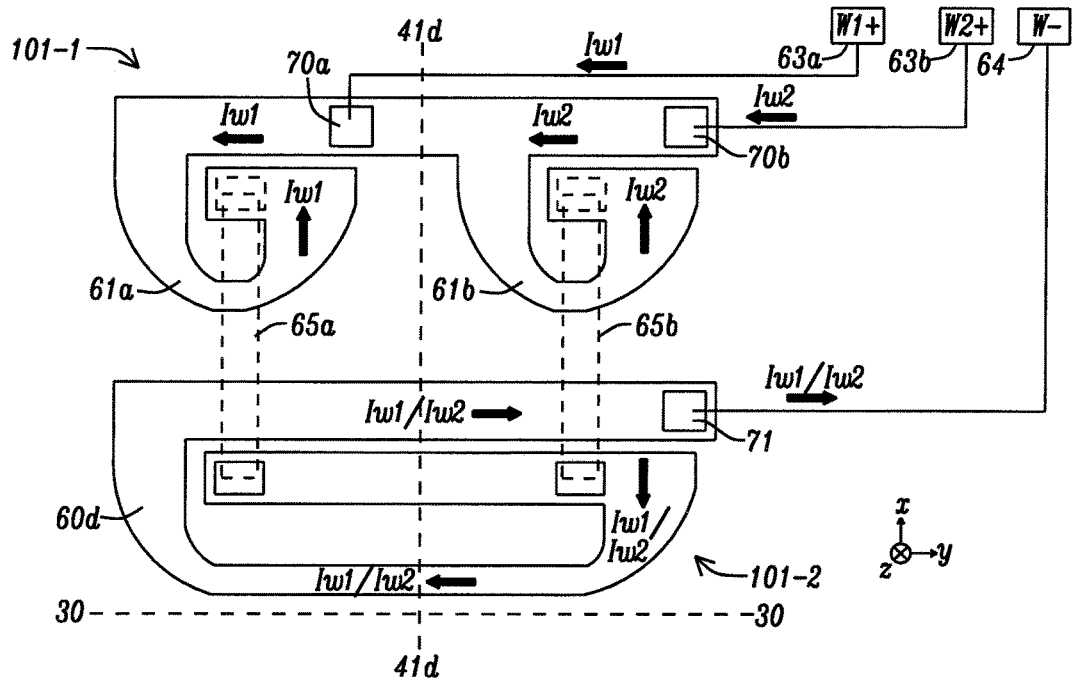

In FIG. 20, an oblique view of the coil and writer pad design of the third embodiment is shown to indicate the path of the write currents. In the exemplary embodiment, write current Iw1 from W1+ pad 63a enters driving coil 61a at contact 70a and flows counterclockwise to interconnect 65a, and then clockwise through common bucking coil 60d to contact 71 before exiting to common W− writer pad 64. Write current Iw2 from W2+ pad 63b enters driving coil 61b at contact 70b and flows counterclockwise to interconnect 65b, and then clockwise through common bucking coil 60d to contact 71 before exiting to common W− writer pad 64.

Figure 21:
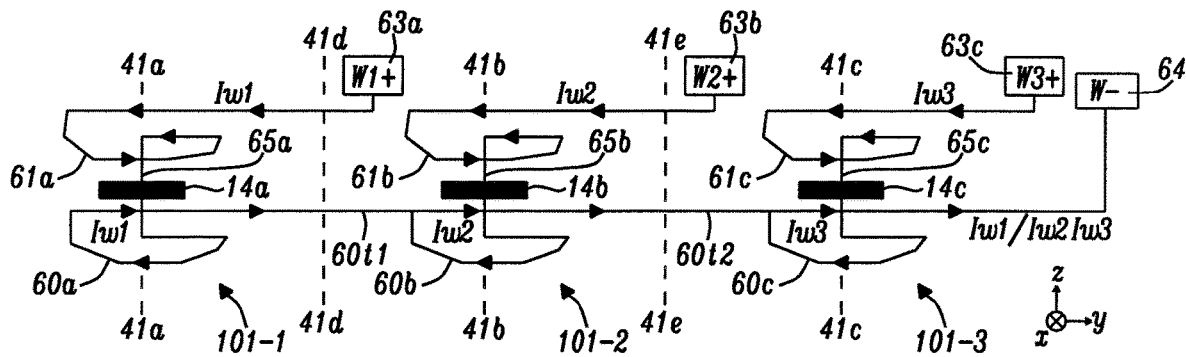
FIG. 21 is a schematic drawing and FIG. 22 is a top-down view of a triple PMR writer with separate pancake driving coils, and where the bucking coils are connected to a common W− pad according to a fourth embodiment of the present disclosure.

According to a fourth embodiment pictured in FIG. 21, the present disclosure encompasses a triple PMR writer having fully separated pancake driving coils, and where there is a first bridge 60t1 at backside 60e between bucking coil 60a for first PMR writer 101-1 and bucking coil 60b for PMR second writer 101-2, and a second bridge 60t2 at backside 60e between bucking coil 60b for the second PMR writer and bucking coil 60c for third PMR writer 101-3 thereby enabling a total of four writer pads to accommodate the three PMR writers in the schematic view. Note there is a third interconnect 65c to allow write current Iw3 to flow from driving coil 61c to bucking coil 60c to activate main pole 14c in the third PMR writer for a write process.

Figure 22:
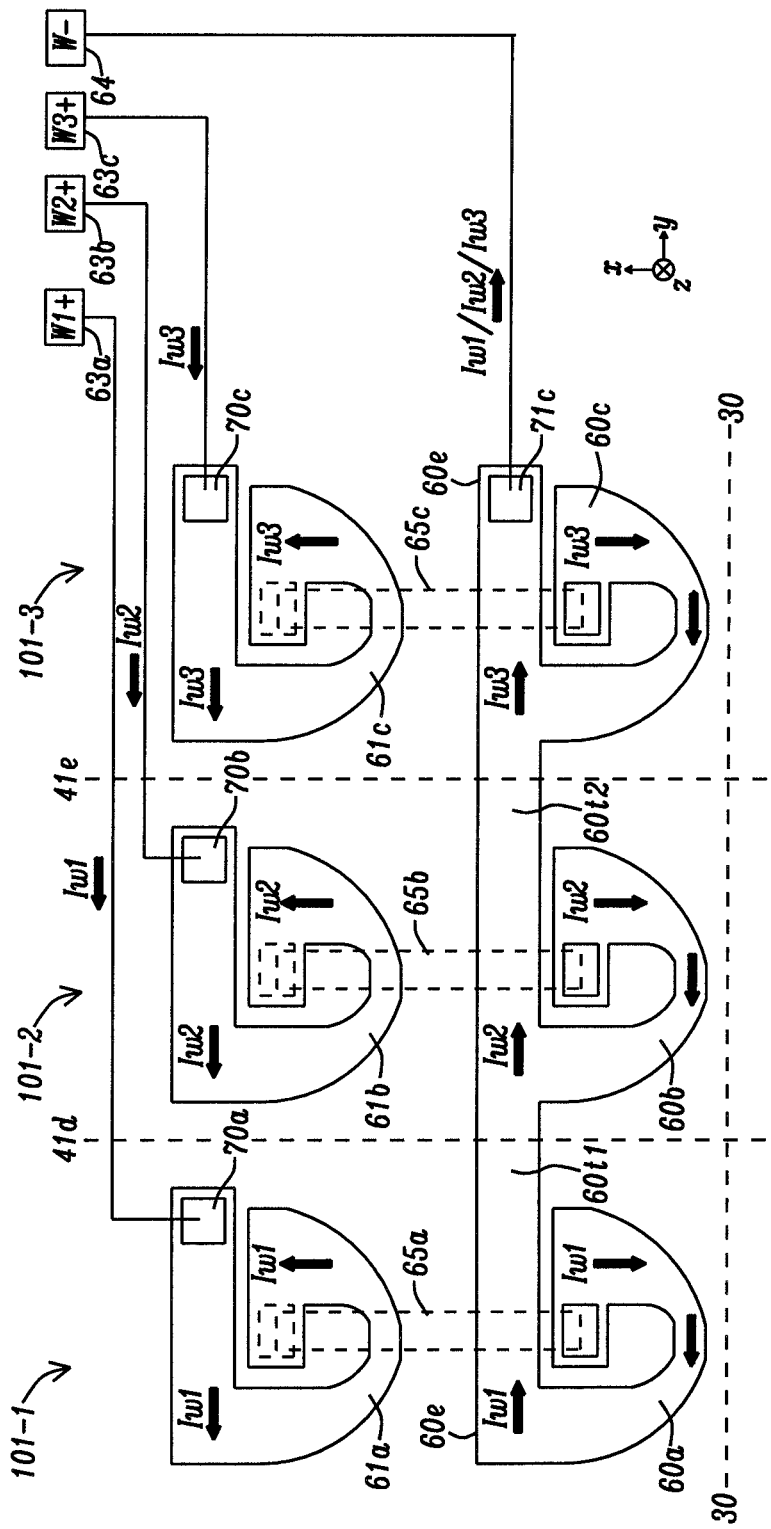

From an oblique view of the fourth embodiment in FIG. 22, MP 14a is energized with write current Iw1 from W1+ pad 63a that enters driving coil 61a at contact 70a and flows counterclockwise to interconnect 65a, and then clockwise in bucking coil 60a through bridge 60t1 to bucking coil 60b and through bridge 60t2 to bucking coil 60c before exiting at contact 71c to common W− pad 64. MP 14b is energized with write current Iw2 from W2+ pad 63b that enters driving coil 61b at contact 70b and flows counterclockwise to interconnect 65b, and then clockwise in bucking coil 60b and through bridge 60t2 to bucking coil 60c before exiting at contact 71c to common W− pad 64. MP 14c is energized with write current Iw3 from W3+ pad 63c that enters driving coil 61c at contact 70c and flows counterclockwise to interconnect 65c, and then clockwise in bucking coil 60c before exiting at contact 71c to common W− pad 64.

Figure 23:
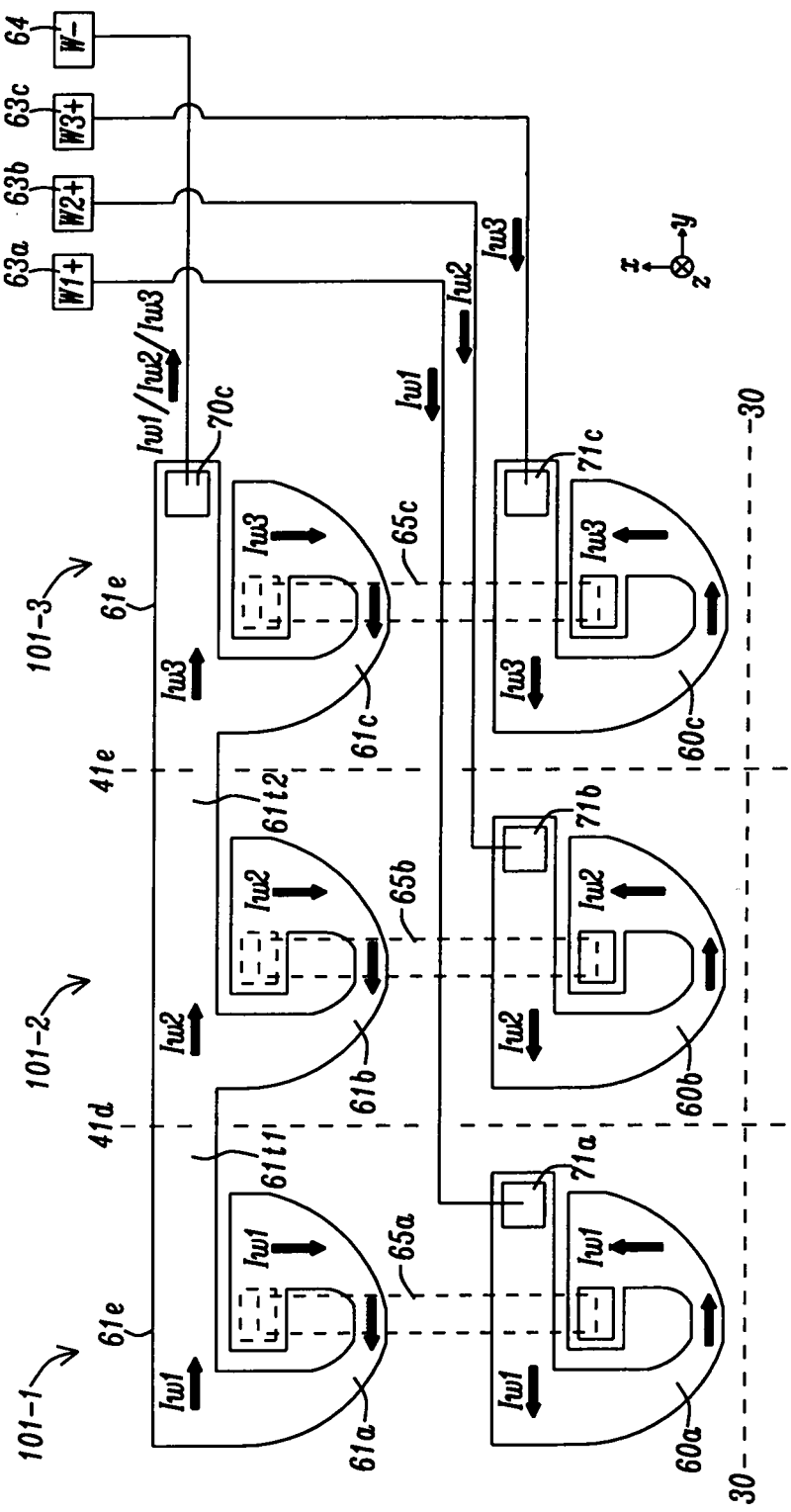
FIG. 23 is a modification of the top-down view in FIG. 22 where the driving coils are connected to a common W− pad, and the bucking coils are fully separated.

An alternative to the triple PMR writer embodiment shown in FIG. 22 is depicted in FIG. 23 wherein three pancake bucking coils are fully separated, and where there is a first bridge 61t1 at backside 61e between driving coil 61a for first PMR writer 101-1 and driving coil 61b for second PMR writer 101-2, and a second bridge 61t2 at backside 61e between driving coil 61b for the second PMR writer and driving coil 61c for third PMR writer 101-3. Again, a total of four writer pads are required, only two more than used with a single PMR writer. Write current Iw1 from W1+ pad 63a enters bucking coil 60a at contact 71a and flows through interconnect 65a to driving coil 61a and across bridge 61t1 to driving coil 61b, and then across bridge 61t2 to driving coil 61c before exiting at pad 70c to common W− pad 64. Write current Iw2 from W2+ pad 63b enters bucking coil 60b at contact 71b and passes through interconnect 65b to driving coil 61b, and then across bridge 61t2 to driving coil 61c before exiting to the common W− pad. Write current Iw3 from W3+ pad 63c enters bucking coil 60c at contact 71c and flows through interconnect 65c to driving coil 61c before exiting to the common W− pad.

Figure 24:
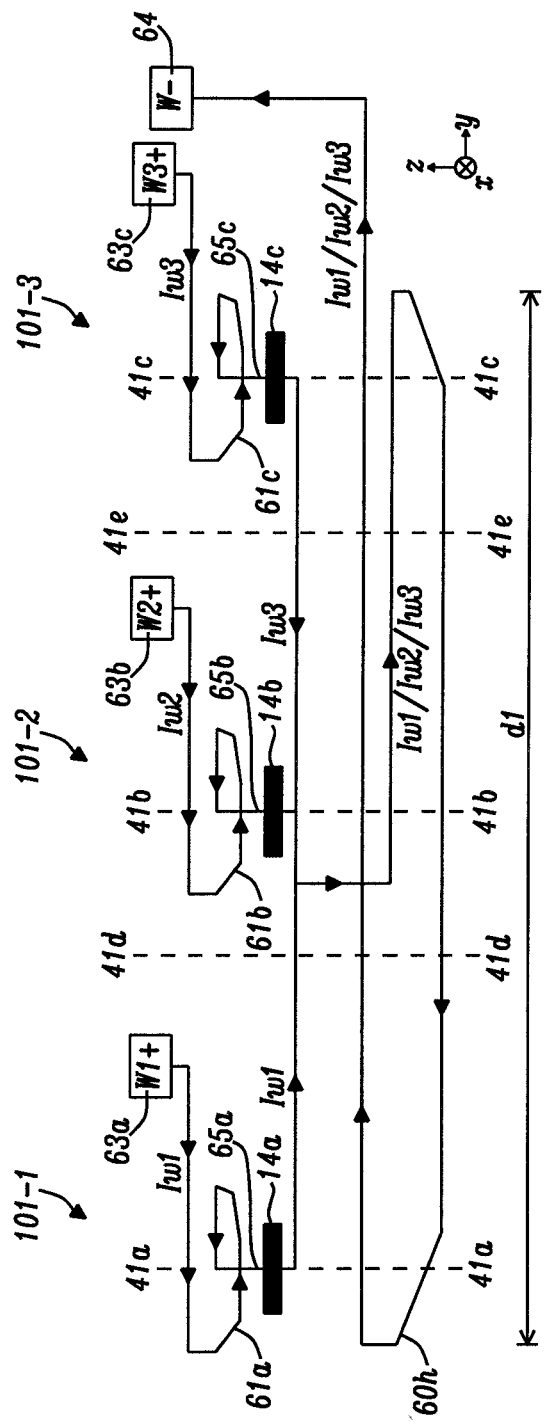
FIG. 24 is a schematic drawing and FIG. 25 is a top-down view of a triple PMR writer with separate pancake driving coils, and a common bucking coil that is connected to a W− pad according to a third embodiment of the present disclosure.

According to another triple PMR writer scheme shown as a fifth embodiment of the present disclosure in the schematic drawing of FIG. 24, the three bucking coils that are connected by two bridges in the fourth embodiment may be replaced by a common bucking coil 60h which is connected to the common W− pad 64. Thus, the driving coil layout and writer pads from FIG. 21 are retained to give separate paths for Iw1, Iw2, and Iw3 until reaching the common bucking coil that has a cross-track width essentially equal to the cross-track footprint d1 of the three driving coils.

Figure 25:
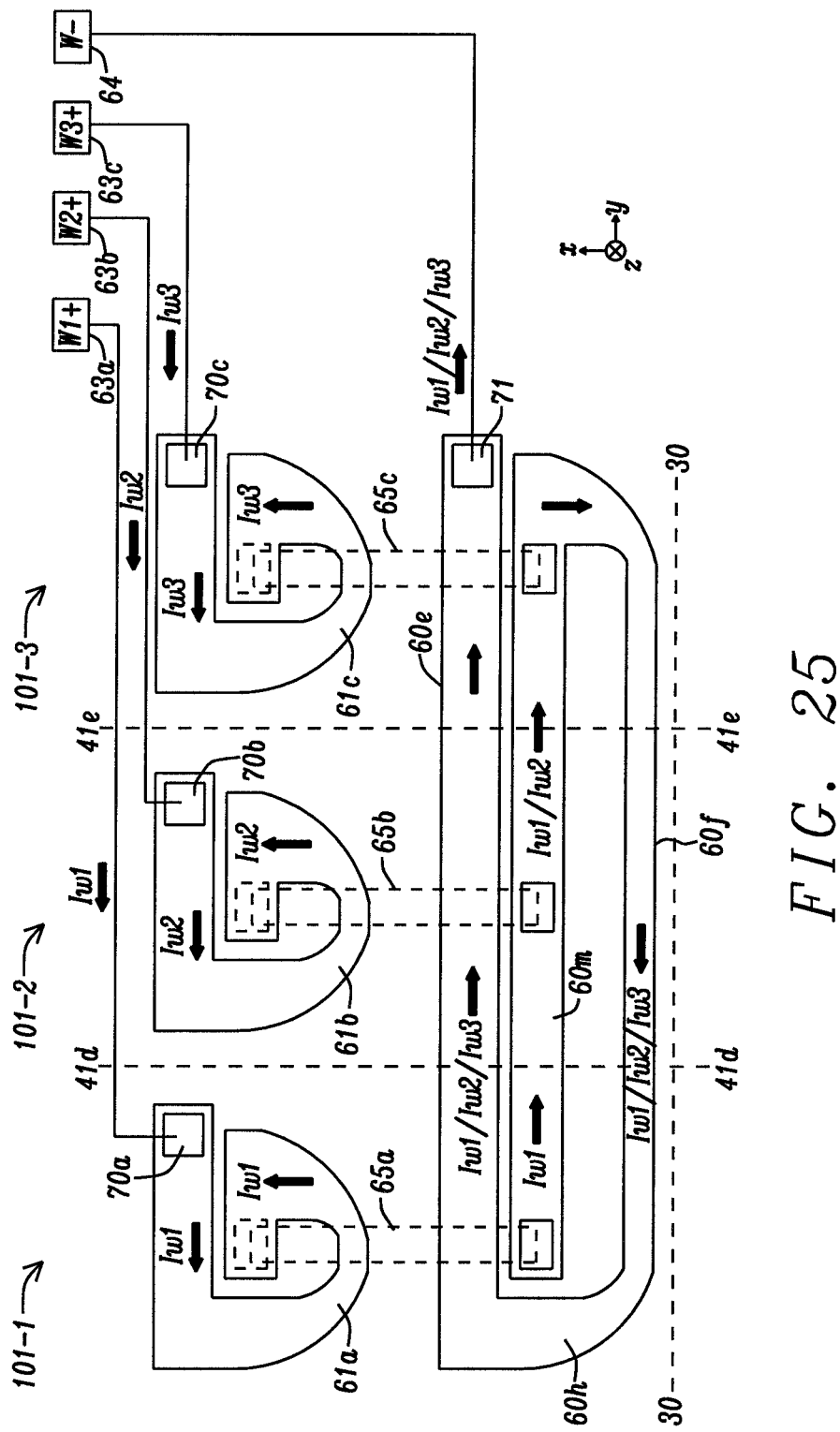

From an oblique view in FIG. 25, the coil layout and writer pads of the fifth embodiment are shown to track the write currents. Note that front side 60f of the common bucking coil 60h is recessed from ABS 30-30, and the three interconnects 65a-65c join the common bucking coil at a mid portion 60m. Here, MP 14a is energized with write current Iw1 from W1+ pad 63a that enters driving coil 61a at contact 70a and flows counterclockwise to interconnect 65a, and then clockwise in common bucking coil 60h before exiting at contact 71c to common W− pad 64. MP 14b is energized with write current Iw2 from W2+ pad 63b that enters driving coil 61b at contact 70b and flows counterclockwise to interconnect 65b, and then clockwise in common bucking coil 60h before exiting at contact 71c to common W− pad 64. MP 14c is energized with write current Iw3 from W3+ pad 63c that enters driving coil 61c at contact 70c and flows counterclockwise to interconnect 65c, and then clockwise in common bucking coil 60h before exiting at contact 71c to the common W− pad. Although not shown, those skilled in the art will appreciate that a common driving coil may be used with three fully separated bucking coils as an alternative to the coil and writer pad design depicted in FIG. 25.

Figure 26:
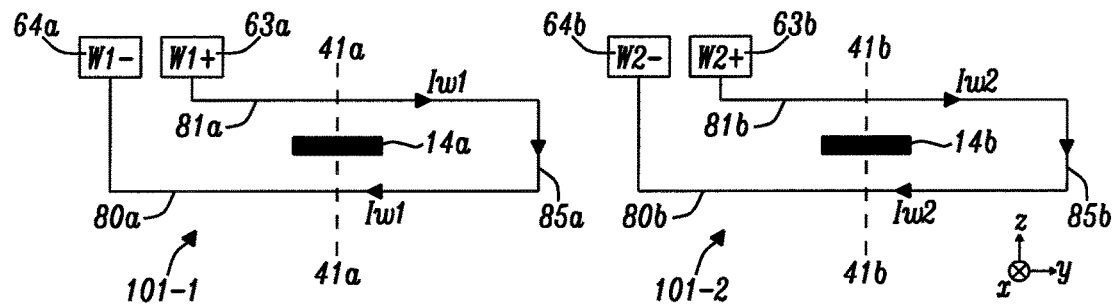
FIG. 26 is a schematic drawing and FIG. 27 is a top-down view of a dual PMR writer having two fully separated helical driving and pancake coils each attached to a writer pad according to a sixth embodiment of the present disclosure.

In FIG. 26, a sixth embodiment of the present disclosure is shown that relates to a dual PMR writer wherein a first main pole 14a in first PMR writer 101-1 is at plane 41a-41a, and a second main pole 14b in second PMR writer 101-2 is at plane 41b-41b. The writer pad layout from the first embodiment in FIG. 13 is retained. However, the pancake coils are replaced with helical driving coils 81a, 81b in the first and second PMR writers, respectively, and with helical bucking coils 80a, 80b in the first and second PMR writers, respectively. Furthermore, interconnect 65a is replaced with side tap 85a to connect coils 81a and 80a, and interconnect 65b is replaced with side tap 85b to connect coils 81b and 80b.

Figure 27:
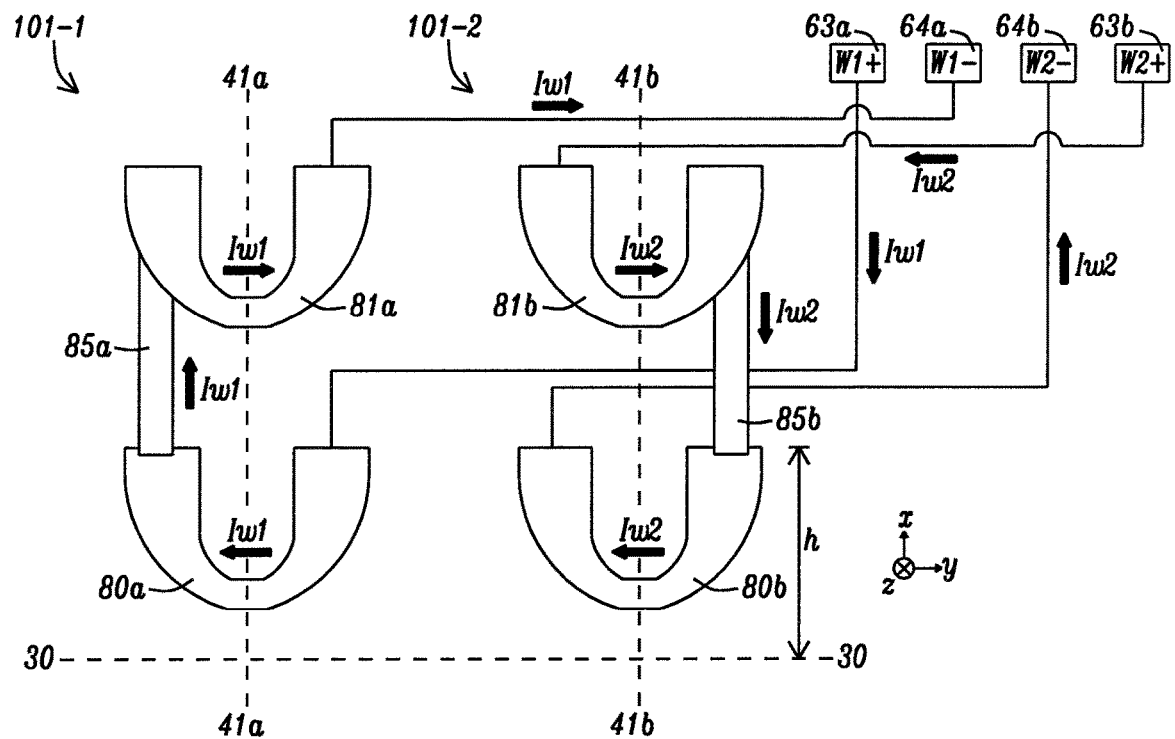

An oblique view of the sixth embodiment is depicted in FIG. 27. Write current Iw1 from W1+ writer pad 63a enters bucking coil 80a and flows clockwise to side tap 85a, and then counterclockwise through driving coil 81a to W1− writer pad 64a in order to energize the first writer. Write current Iw2 from W2+ writer pad 63b enters driving coil 81b and flows counterclockwise to side tap 85b, and then clockwise through bucking coil 80b to W2− writer pad 64b in order to energize the second writer. A total of four writer pads is maintained from the first embodiment. In the sixth through ninth embodiments shown in FIGS. 26-34, the side taps 85a, 85b are recessed at height h from 2 to 8 microns from the ABS 30-30.

Figure 28:
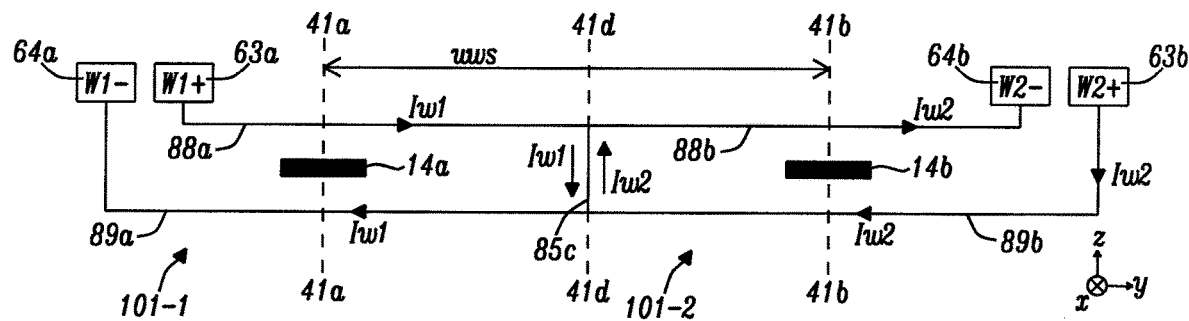
FIG. 28 is a schematic drawing of a dual PMR writer with helical driving and bucking coils and a common side tap according to a seventh embodiment described herein.

According to a seventh embodiment shown in FIG. 28 that is similar to the dual PMR writer disclosed in related U.S. Pat. No. 10,311,900, the helical coil design of the sixth embodiment is modified with the use of a center tap 85c rather than two side taps. Moreover, two fully separated helical driving coils are replaced with a symmetrical driving coil having a first outer portion 88a on one side of center plane 41d-41d, and a second outer portion 88b (mirror image of 88a) on the other side of the center plane. Similarly, two fully separated helical bucking coils are replaced with a symmetrical bucking coil having a first outer portion 89a below first outer portion 88a in the first PMR writer, and a second outer portion 89b below second outer portion 88b in the second PMR writer. A total of four writer pads is maintained from the previous embodiment.

Figure 29:
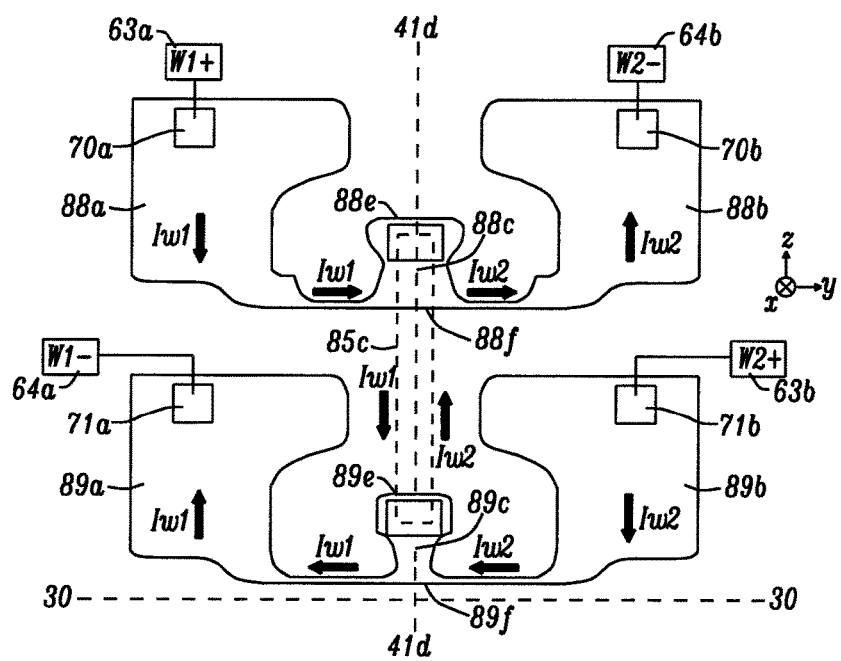
FIGS. 29-30 are top-down views of the embodiment in FIG. 28 that show two different pathways for a write current to activate the first writer or second writer.

Referring to FIG. 29, an oblique view of the seventh embodiment is provided. The driving (top) coil (TC) has a center portion 88c that extends from front side 88f to backside 88e, adjoins outer portions 88a, 88b, and contacts a top surface of center tap 85c. The bucking coil (BC) has a center portion 89c that extends from front side 89f to backside 89e, adjoins outer portions 89a, 89b, and contacts a bottom surface of the center tap. Both front sides are recessed from ABS 30-30. Write current Iw1 from W1+ writer pad 63a enters first outer portion 88a at contact 70a and flows through the TC center portion to the top of the center tap, and then from the bottom of the center tap through the BC center portion and BC first outer portion 89a before exiting at contact 71a to W1− writer pad 64a. Write current Iw2 from W2+ writer pad 63b enters BC second outer portion 89b at contact 71b and flows the through BC center portion to the bottom of the center tap, and then from the top of the center tap through the TC center portion and TC second outer portion 88b before exiting at contact 70b to W2− writer pad 64b. Only Iw1 flows when the first PMR writer is activated for writing, and only Iw2 flows when the second PMR writer is energized for writing.

Figure 30:
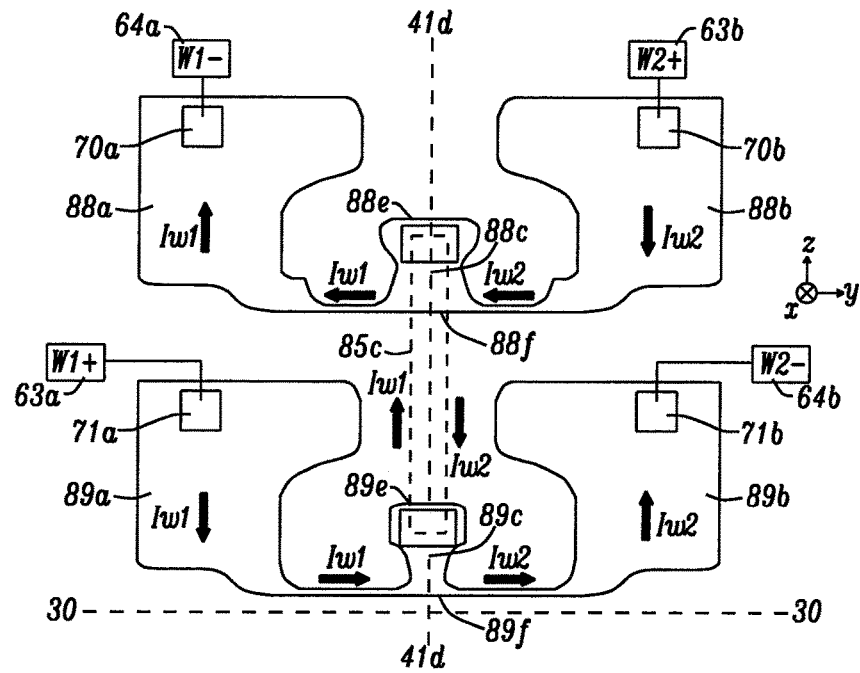

Referring to FIG. 30, write current in the seventh embodiment may flow in the opposite direction to that shown in FIG. 29. Thus, Iw1 from W1+ pad 63a may enter the first BC outer portion 89a at contact 71a and flow through the BC center portion 89c and center tap 85c to the TC center portion 88c and first TC outer portion 88a and then exit to writer pad W1− 64a. Moreover, Iw2 from W2+ pad 63b may enter second TC outer portion 88b and pass through the TC center portion and the center tap to the BC center portion and second BC outer portion 89b before exiting at contact 71b to W2− pad 64b. A total of four writer pads are employed in the seventh embodiment.

Figure 31:
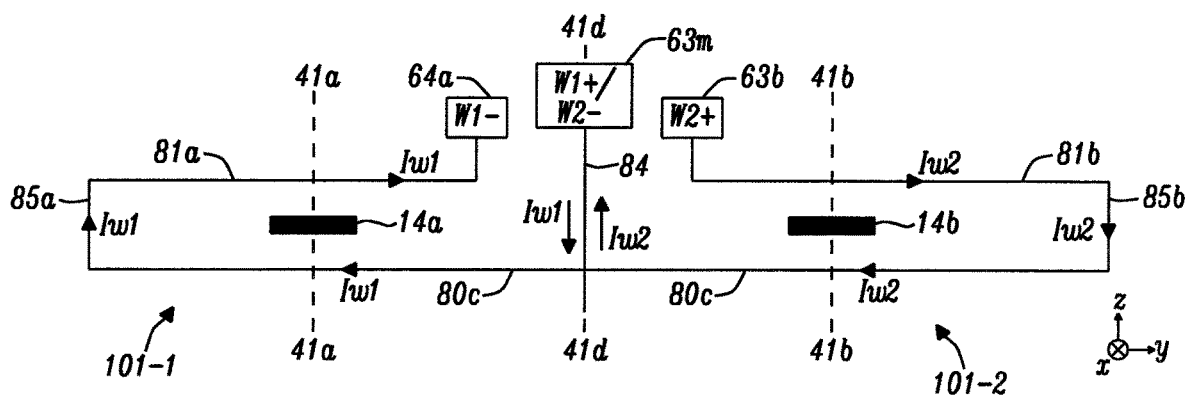
FIG. 31 is a schematic drawing and FIG. 32 is a top-down view of a dual PMR writer having two fully separated helical driving coils and a common lead to a common bucking coil according to an eighth embodiment of the present disclosure.
Figure 32:
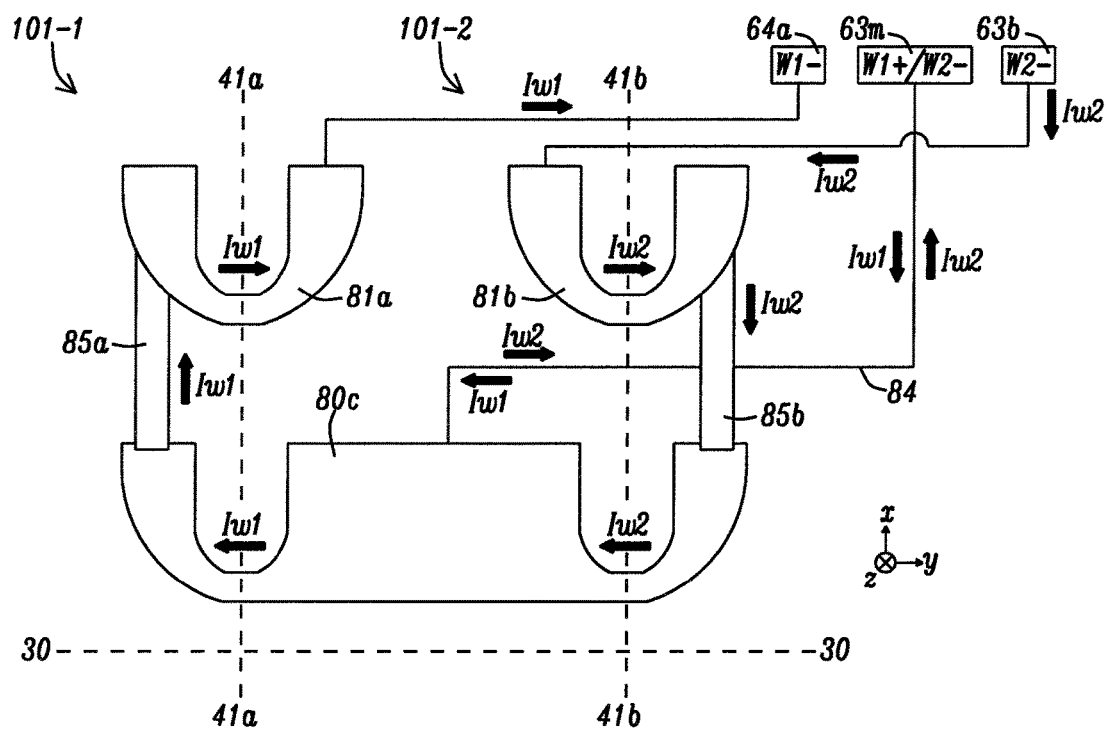

An eighth embodiment is depicted in the schematic drawing of FIG. 31 and oblique view of FIG. 32, and represents a modification of the sixth embodiment where a common bottom coil 80c is connected to a common lead 84 that serves to input Iw1 from W1−/W2+ pad 63m to the common bottom coil, and to carry output Iw2 from the common bottom coil to the W1−/W2+ pad. Therefore, Iw1 flows clockwise through a left portion of coil 80c and through side tap 85a, and then flows counterclockwise through helical driving coil 81a before exiting to W1− pad 64a. Iw2 from W2+ pad 63b flows counterclockwise through helical driving coil 81b and through side tap 85b into the common bottom coil, and flows clockwise through a right portion thereof before exiting through lead 84 to W1+/W2− pad 63m. This coil/writer pad design requires only three writer pads.

Figure 33:
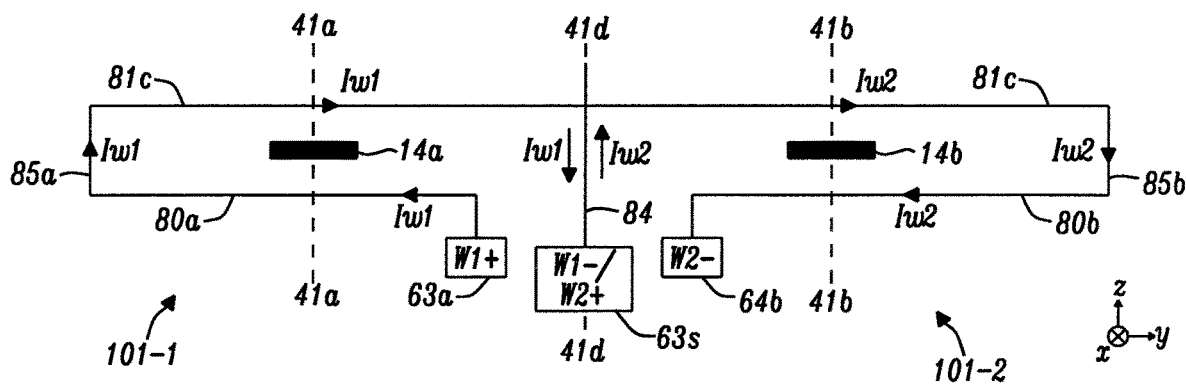
FIG. 33 is a schematic drawing and FIG. 34 is a top-down view of a dual PMR writer having a common lead to a common helical driving coil, and two fully separated bucking coils according to a ninth embodiment of the present disclosure.
Figure 34:
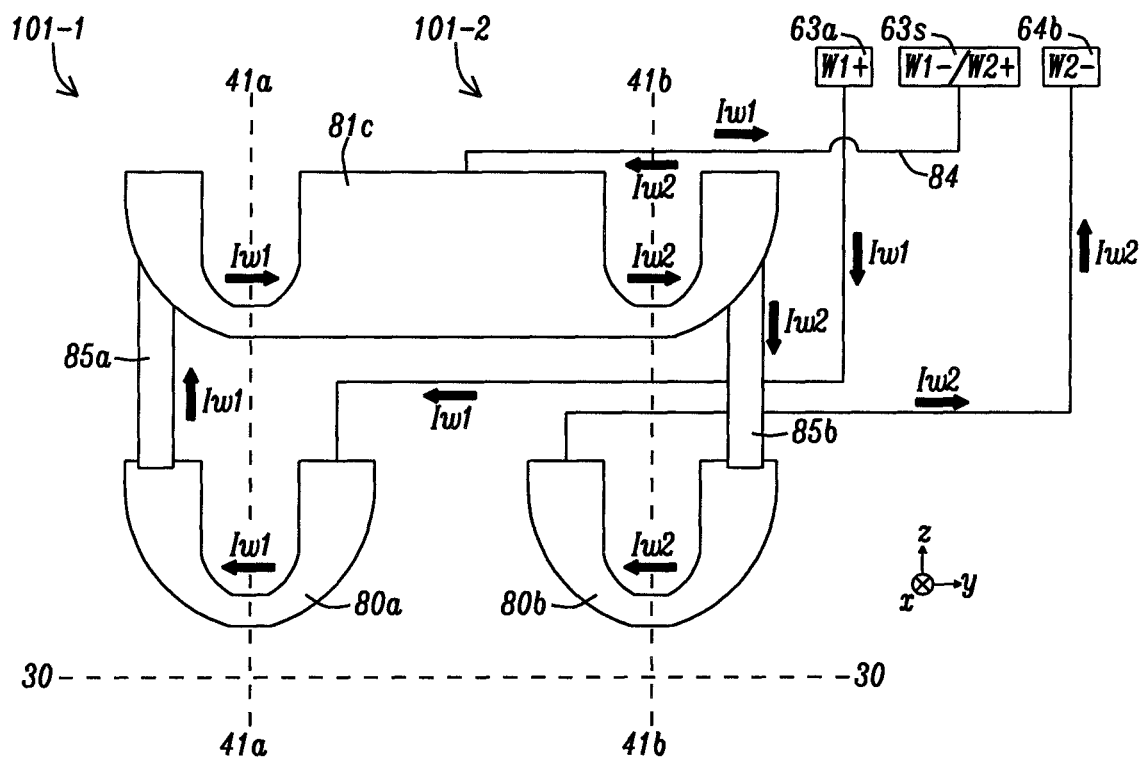

The schematic drawing in FIG. 33 and oblique view in FIG. 34 depict a ninth embodiment, which is a modification of the eighth embodiment where the common lead 84 from a W1−/W2+ pad 63s is connected to a common top coil 81c. Accordingly, Iw1 from W1+ pad 63a flows clockwise through bucking coil 80a, through side tap 85a, and counterclockwise through a left portion of the common top coil before exiting through common lead 84 to the W1−/W2+ pad. When the second PMR writer is used for writing, Iw2 from the W1−/W2+ pad flows from the common lead and counterclockwise through a right portion of the common top coil, through side tap 85b, and then clockwise through bucking coil 80b before exiting to W2− pad 64b.

Figure 35:
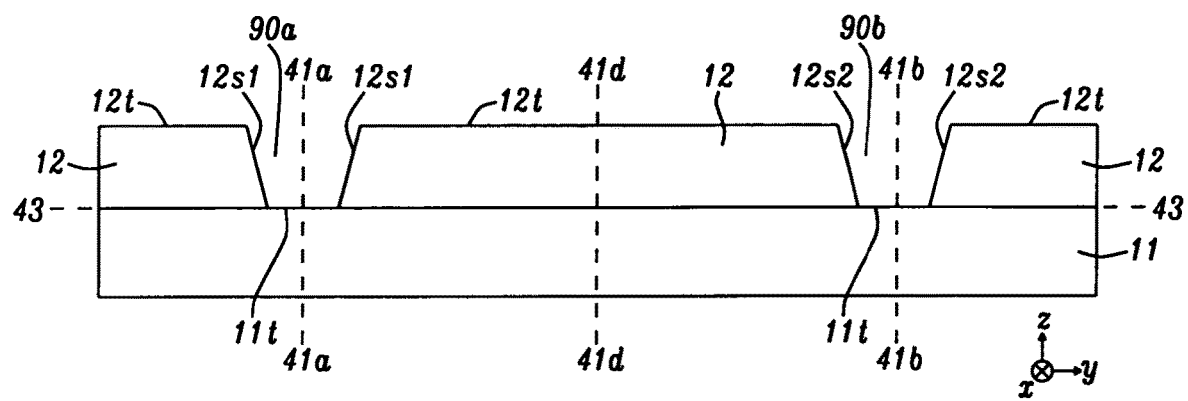
FIGS. 35-36 show a sequence of steps for depositing two main pole layers simultaneously to form a dual PMR writer on a substrate.
Figure 36:
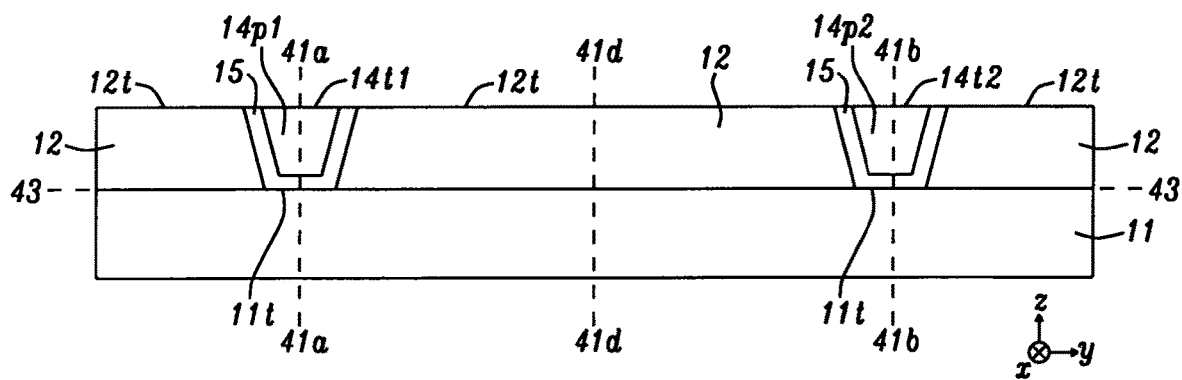

Key features of fabricating a dual PMR writer according to the present disclosure are depicted in FIGS. 35-36. Referring to FIG. 35, an ABS view is depicted of side shield layer 12 deposited on leading shield 11 wherein the leading shield is formed on a substrate (not shown) that may comprise one or two readers with center plane 41d-41d, and a common bucking coil or separate bucking coils. The side shield layer has top surface 12t and is patterned by a conventional photolithography method followed by an ion beam etch (IBE) or reactive ion etch (RIE) process to form opening 90a with sidewalls 12s1 equidistant from plane 41a-41a, and opening 90b having sidewalls 12s2 equidistant plane 41b-41b. As a result, leading shield top surface 11t at plane 43-43 is exposed in the openings. If a tapered leading side of the main pole layers is desired, a conventional IBE technique is performed at this point such that the top surface within the openings is no longer orthogonal to planes 41a-41a and 41b-41b.

A dielectric material is conformally deposited by a plasma enhanced chemical vapor deposition (PECVD) method or the like on the sides 12s1, 12s2 and top surface 11t to partially fill openings 80a, 80b. As a result, leading gap 13 is formed on top surface 11t and side gaps 15 are generated on sides 12s1, 12s2. The leading gap and side gap layers may be comprised of one or more dielectric materials including alumina, silica, and other metal oxides, nitrides, or oxynitrides. On the aforementioned gap layers, there may also be an uppermost metal layer (not shown) such as Ru that promotes the deposition of uniform main pole layers during a subsequent plating process.

Referring to FIG. 36, first main pole layer (MP1) 14a and the second main pole layer (MP2) 14b are simultaneously plated in opening 80a and opening 80b, respectively, by a conventional method and then a chemical mechanical polish (CMP) process is performed to generate trailing side 14t1 on MP1, and trailing side 14t2 on MP2 that are coplanar with top surfaces 12t of side shields 12. Those skilled in the art will appreciate that at this point, a well known process sequence may be employed to form a taper on the trailing sides 14t1, 14t2 such that a down-track distance between the trailing sides and plane 42-42 becomes greater with increasing distance from the ABS up to a throat height, for example. It is important that the shape of MP1 is essentially a mirror image of the MP2 shape with respect to center plane 41c-41c. Thereafter, a conventional series of steps is employed to form a write gap 16, hot seed layer 17, trailing shield 18, as well as a common driving coil or separate driving coils overlying MP1 and MP2. As a final step in the dual PMR writer fabrication, a lapping process (not shown) is performed to generate a first pole tip in MP1 that is bisected by plane 41a-41a at the ABS, and that forms a second pole tip in MP2 that is bisected by plane 41b-41b at the ABS.

Although a fabrication method of forming a triple PMR writer is not shown, the same sequence of steps may be used as illustrated for the dual PMR process flow. Thus, for multiple PMR writers of the present disclosure, the same number of process steps is used to form a single PMR writer or a multiple PMR writer since all PMR writers having a shared base writer structure are formed simultaneously.

Commercially available Finite Element Method (FEM) modeling software was used to demonstrate the benefits of a dual PMR writer with a coil/writer pad design according to various embodiments of the present disclosure compared with a single writer. Two base writer structures are considered in the modeling and are rDWS-no BGC shown in FIG. 8, and rDWS BGC depicted in FIG. 9. Results are found in Table 1 below.

tap" (recessed 8 microns from ABS). Except for two cases involving the common bottom coil in Embodiment 3, the existence of the unselected writer has negligible influence on the selected writer. We find that the selected writer in a dual PMR writer has similar performance to a single PMR writer in all aspects such as erase width in AC mode (EWAC), Hy field, trailing and side shield return fields, down-track gradient, and cross-track gradient. With regard to Embodiment 3, results indicate EWAC, Hy field, down-track and cross-track gradients are similar to that of a single PMR writer, but trailing and side shield return fields are degraded.

We have also observed that for all cases of separated bottom coil designs, the Hy field from the unselected PMR writer is <50 Oe when the selected write pole is writing. The Hy field around the unselected writer pole in the writer shield is even less. For common bottom coil designs, the Hy field from the unselected PMR writer is up to 900 Oe when the selected writer pole is writing. The Hy field around the unselected writer pole in the writer shield may also reach about 600 Oe according to our modeling studies. In summary, there is no erasure concern from the unselected PMR writer when the selected PMR writer is writing according to FEM studies.

Figure 37:
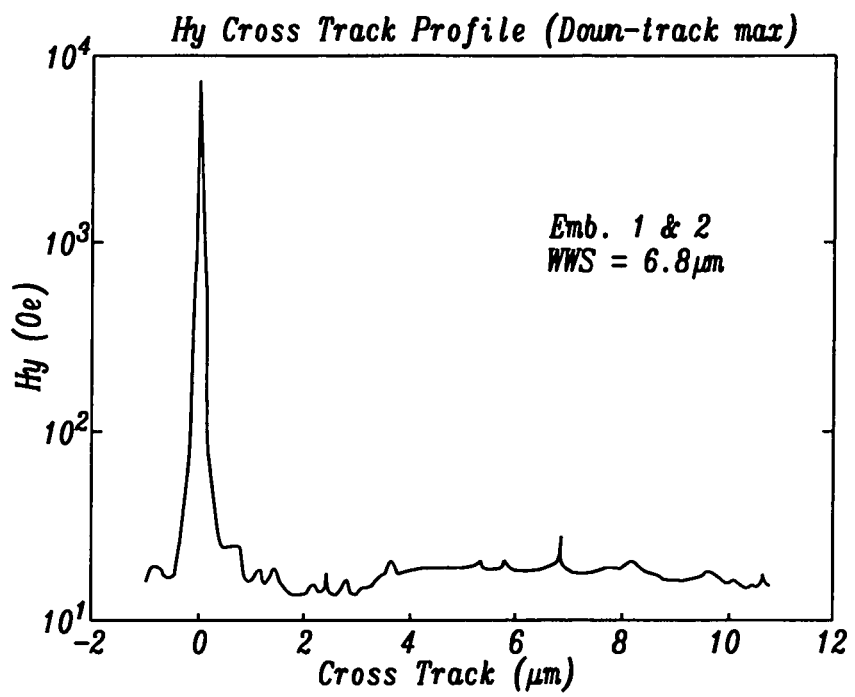
FIGS. 37-38 are plots of Hy cross-track profile for the dual PMR writers of the first and second embodiments, and the third embodiment, respectively.

FIG. 37 shows a plot of Hy field vs. cross track position for embodiment 1 (fully separated bottom coils) and embodiment 2 (bottom coils joined at backside) with the rDWS BGC base writer structure. Note that the bridge described with respect to FIG. 16 has essentially no effect on magnetic performance so that the results are superimposed on each other in the drawing. As with all separated bottom

TABLE 1

FEM modeling results for various writer/coil designs

| Type | Writer | WWS (mm) | Coil type | EWAC (nm) | Hy (Oe) | TS ret. field (Oe) | SS ret. field (Oe) | DT grad (Oe/nm) | CT grad (Oe/nm) |
|---|---|---|---|---|---|---|---|---|---|
| rDWS-BGC | Single | NA | Pancake | 48.0 | 7112.6 | −261.6 | 905.5 | 226.0 | 167.6 |
| rDWS-BGC | Dual | 6.8 | Emb. 1, 2 | 48.1 | 7122.2 | −251.4 | 905.7 | 230.9 | 165.0 |
| rDWS-BGC | Dual | 8.8 | Emb. 1, 2 | 48.0 | 7122.1 | −260.7 | 908.9 | 230.2 | 169.2 |
| rDWS-no BGC | Dual | 6.8 | Emb. 1, 2 | 48.1 | 7120.4 | −255.0 | 904.9 | 230.9 | 165.0 |
| rDWS-no BGC | Dual | 8.8 | Emb. 1, 2 | 47.9 | 7119.7 | −265.3 | 908.1 | 230.2 | 169.2 |
| rDWS-BGC | Dual | 6.8 | Emb. 3 | 48.3 | 7147.2 | −219.9 | 928.0 | 230.8 | 165.1 |
| rDWS-BGC | Dual | 6.8 | Emb. 6-9 near tap | 48.0 | 7115.3 | −264.4 | 904.7 | 231.0 | 162.3 |
| rDWS-BGC | Dual | 6.8 | Emb. 6-9 far tap | 48.1 | 7119.3 | −257.7 | 907.6 | 230.9 | 162.3 |
| rDWS-no BGC | Dual | 6.8 | Emb. 3 | 48.3 | 7147.8 | −221.6 | 929.4 | 230.9 | 165.1 |
| rDWS-no BGC | Dual | 6.8 | Emb. 6-9 near tap | 48.1 | 7119.3 | −257.0 | 906.2 | 230.9 | 162.3 |
| rDWS-no BGC | Dual | 6.8 | Emb. 6-9 far tap | 48.1 | 7120.9 | −254.3 | 908.4 | 230.9 | 165.0 |

The dual PMR writers have a shared PP3 trailing shield, write shield, leading shield, LSB, S2C, and RTP but separate LBG, BGC, tBY, TY, and MP according to a previously described embodiment. The distance between the two main pole tips (WWS) is assumed to be 6.8 microns for all except two cases with WWS=8.8 microns. For pancake coil designs, Embodiments 1 and 2 provide essentially equivalent results, and Embodiment 3 is a special case. For helical coil designs, Embodiments 6-9 provide essentially equivalent results and feature two different locations of the side tap that are "near tap" (recessed 3 microns from ABS) and "far coil designs, the Hy field from the unselected PMR writer is <100 Oe when the selected PMR writer is writing. Moreover, the Hy field around the unselected writer pole in the write shield is proximate to zero.

Figure 38:
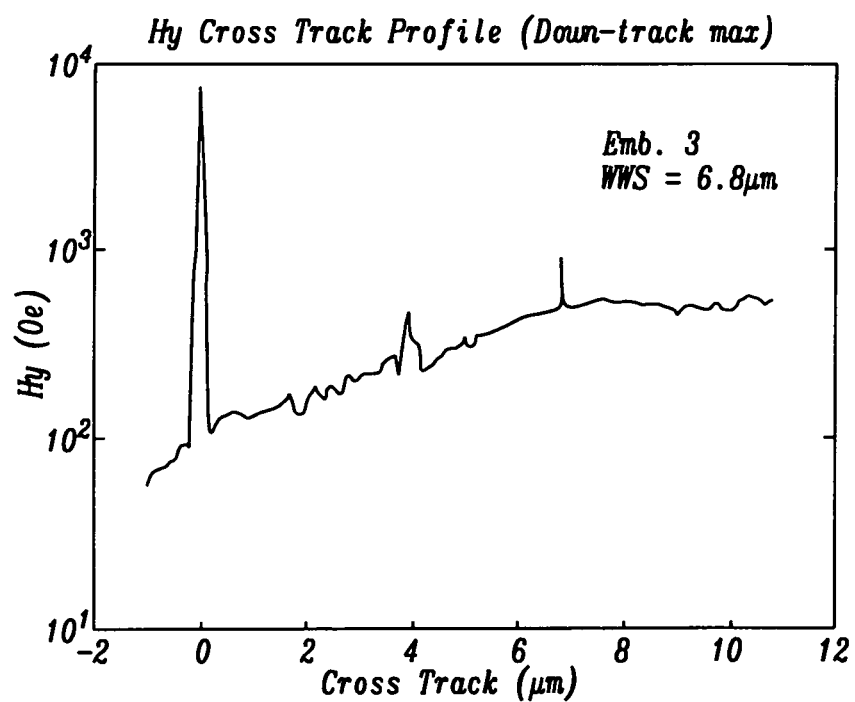

FIG. 38 depicts a plot of Hy field vs. cross track position for embodiment 3 (common bottom coil) with the rDWS BGC base writer structure. The Hy field from the unselected PMR writer is up to 900 Oe when the selected PMR writer is writing. Furthermore, the Hy field around the unselected writer pole in the write shield can also reach 500 Oe according to FEM modeling.

When track width (TW) shrinks below 100 nm, it is often difficult to achieve symmetry between first and second PMR writers in a dual PMR writer, or between three PMR writers in a triple PMR writer structure, and there will be variations in performance between PMR writers for a given target TW. However, we have found that mean ADC is improved and the sigma is tightened when the better PMR writer in a dual or triple PMR writer of the present disclosure is integrated in a HGA as described in related U.S. Pat. No. 10,279,451.

While the present disclosure has been particularly shown and described with reference to, the preferred embodiment thereof, it will be understood by those skilled in the art that various changes in form and details may be made without departing from the spirit and scope of this disclosure.

We claim:

1. A multiple perpendicular magnetic recording (PMR) writer, comprising:
    (a) a first main pole layer (MP1) in a first PMR writer formed on a slider, wherein the first PMR writer is configured for writing on a magnetic recording medium by passing a first current ($Iw1$) through a first circuit comprised of a first top coil, a first bottom coil, and a first interconnect that connects the first top and bottom coils thereby energizing MP1;
    (b) a second main pole layer (MP2) in a second PMR writer on the slider and wherein a center of MP2 is separated from a center of MP1 by a cross-track writer-writer spacing (WWS), and wherein the second PMR writer is configured for writing on the magnetic medium by passing a second current ($Iw2$) through a second circuit comprised of a second top coil, a second bottom coil, and a second interconnect that connects the second top and bottom coils thereby energizing MP2;
    (c) a first writer pad W1+ configured to input $Iw1$ into the first circuit; and
    (d) a second writer pad W2+ configured to input $Iw2$ into the second circuit, and wherein each of the first top coil and second top coil have a front side that is recessed from an air bearing surface (ABS), and the first top coil and the second top coil are joined by a bridge that forms a continuous backside on the first and second top coils and bridge to enable a common writer pad W− to receive $Iw1$ output from the first circuit or $Iw2$ output from the second circuit.

2. The multiple PMR writer of claim 1 wherein $Iw1$ passes through the bridge to a back side of the second top coil before reaching the common writer pad W−.

3. The multiple PMR writer of claim 1 wherein WWS is <15 microns.

4. A head gimbal assembly (HGA) comprising a suspension on which the slider according to claim 1 is formed, and wherein the suspension comprises a load beam with one end connected to a flexure, and a base plate connected to the other end of the load beam.

5. A magnetic recording apparatus, comprising:
    (a) the HGA according to claim 4;
    (b) a magnetic recording medium positioned opposite to the slider;
    (c) a spindle motor that rotates and drives the magnetic recording medium; and
    (d) a device that supports the slider, and that positions the slider relative to the magnetic recording medium.

* * * * *